US008380708B2

(12) United States Patent
Dettinger et al.

(10) Patent No.: US 8,380,708 B2
(45) Date of Patent: Feb. 19, 2013

(54) METHODS AND SYSTEMS FOR ORDERING QUERY RESULTS BASED ON ANNOTATIONS

(75) Inventors: Richard D. Dettinger, Rochester, MN (US); Daniel P. Kolz, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 12/041,743

(22) Filed: Mar. 4, 2008

(65) Prior Publication Data

US 2008/0154901 A1 Jun. 26, 2008

Related U.S. Application Data

(62) Division of application No. 10/999,498, filed on Nov. 30, 2004, now abandoned.

(51) Int. Cl.
G06F 7/00 (2006.01)
G06F 17/30 (2006.01)

(52) U.S. Cl. ...................................................... 707/723

(58) Field of Classification Search .................. 707/722, 707/723, 724, 736, 752, 999.007
See application file for complete search history.

(56) References Cited

U.S. PATENT DOCUMENTS

| 4,575,798 A | | 3/1986 | Lindstrom et al. | |
|---|---|---|---|---|
| 5,619,709 A | * | 4/1997 | Caid et al. ....................... | 715/209 |
| 5,630,121 A | | 5/1997 | Braden-Harder et al. | |
| 5,734,887 A | | 3/1998 | Kingberg et al. | |
| 6,009,422 A | | 12/1999 | Ciccarelli | |
| 6,012,053 A | | 1/2000 | Pant et al. | |
| 6,061,677 A | * | 5/2000 | Blinn et al. ......................... | 707/3 |
| 6,108,650 A | * | 8/2000 | Musk et al. ......................... | 707/4 |
| 6,233,586 B1 | | 5/2001 | Chang et al. | |
| 6,457,009 B1 | | 9/2002 | Bollay | |
| 6,460,043 B1 | | 10/2002 | Tabbara et al. | |
| 6,553,368 B2 | | 4/2003 | Martin et al. | |
| 6,601,065 B1 | | 7/2003 | Nelson et al. | |
| 6,611,825 B1 | * | 8/2003 | Billheimer et al. ............. | 706/45 |
| 6,725,227 B1 | | 4/2004 | Li | |
| 6,760,720 B1 | * | 7/2004 | De Bellis ....................... | 707/706 |
| 6,820,076 B2 | | 11/2004 | Bailey et al. | |
| 6,865,567 B1 | | 3/2005 | Oommen et al. | |

(Continued)

FOREIGN PATENT DOCUMENTS

JP 04127321 A * 4/1992

OTHER PUBLICATIONS

Calmet et al., "A generic query-transaction framework for a mediator architecture," Proceedings of the 13th International Conference on Data Engineering, Apr. 1997: pp. 434-443.

(Continued)

Primary Examiner — Marc Somers
(74) Attorney, Agent, or Firm — Patterson & Sheridan LLP

(57) ABSTRACT

A system, method and article of manufacture for managing query results and, more particularly, for sorting data records contained in a query result obtained in response to execution of a query against a database. In one embodiment, the data records in the query result are sorted on the basis of related information which is retrieved from a corresponding data source. In another embodiment, the sorting is performed on the basis of a value variance which is determined for each of the data records in the query result. In still another embodiment, the sorting is performed on the basis of a requested value range coverage. In yet another embodiment, the sorting is performed on the basis of suitability scores which are determined with respect to analysis routines which are configured for processing the query result.

19 Claims, 14 Drawing Sheets

U.S. PATENT DOCUMENTS

| | | | |
|---|---|---|---|
| 6,928,431 B2 | 8/2005 | Dettinger et al. | |
| 6,944,613 B2 * | 9/2005 | Lef et al. | 707/707 |
| 6,954,748 B2 | 10/2005 | Dettinger et al. | |
| 6,980,984 B1 * | 12/2005 | Huffman et al. | 707/3 |
| 6,996,558 B2 | 2/2006 | Dettinger et al. | |
| 7,096,229 B2 | 8/2006 | Dettinger et al. | |
| 2002/0078068 A1 | 6/2002 | Krishnaprasad et al. | |
| 2002/0169765 A1 | 11/2002 | Saltz | |
| 2003/0028495 A1 | 2/2003 | Pallante | |
| 2003/0172056 A1 * | 9/2003 | Dettinger et al. | 707/3 |
| 2004/0068489 A1 * | 4/2004 | Dettinger et al. | 707/3 |
| 2005/0027705 A1 * | 2/2005 | Sadri et al. | 707/5 |
| 2005/0222989 A1 | 10/2005 | Haveliwala et al. | |
| 2006/0010127 A1 | 1/2006 | Dettinger et al. | |
| 2006/0106762 A1 * | 5/2006 | Caracas et al. | 707/3 |
| 2006/0116983 A1 | 6/2006 | Dettinger et al. | |

OTHER PUBLICATIONS

Llama, "Search Code: Search Your Database," <http://www.codewalkers.com/c/a/Search-Code/Search-Your Database/>, retrieved Mar. 23, 2009, pp. 1-4.

Meng et al., "A Theory of Translation From Relational Queries to Hierarchical Queries," IEEE Transactions on Knowledge and Data Engineering, Apr. 1995, vol. 7(2): pp. 228-245.

* cited by examiner

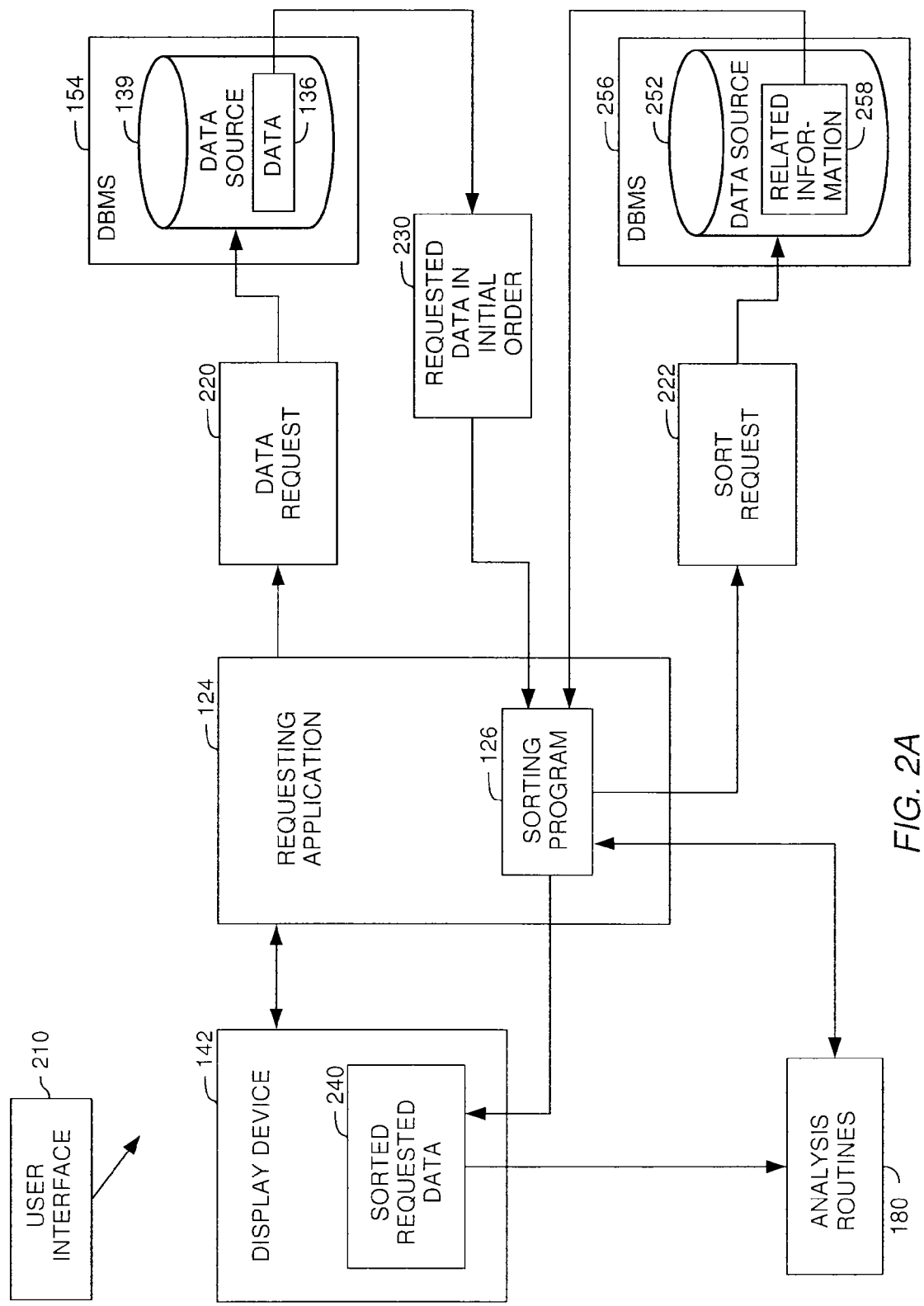

METHODS AND SYSTEMS FOR ORDERING QUERY RESULTS BASED ON ANNOTATIONS

CROSS-RELATED APPLICATION

This application is a divisional of U.S. patent application Ser. No. 10/999,498, filed Nov. 30, 2004 now abandoned, which is hereby incorporated herein in its entirety.

BACKGROUND OF THE INVENTION

1. Field of the Invention

The present invention generally relates to managing query results and, more particularly, to ordering data records contained in a query result obtained in response to execution of a query against a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Processing queries and query results can consume significant system resources, particularly processor resources. Furthermore, one difficulty when dealing with large query results, i.e., query results including a large amount of data, is to identify relevant information therefrom.

A number of techniques have been employed to deal with this difficulty. For instance, query languages generally provide some functionality for ordering query results so that retrieval of relevant information can be simplified. In SQL, for example, an ORDER BY clause can be used to order rows of a given query result presented in a tabular form according to an ascending or descending order of data contained in a user-selected column of the query result. Furthermore, a given query result can be represented graphically to outline the information conveyed by the query result. However, such techniques still require a significant amount of user interaction to identify the relevant information, especially from large query results. Thus, these techniques are an ineffective means to support users in easily and rapidly identifying relevant information from query results.

Therefore, there is a need for an efficient technique for presenting query results to users in order to simplify identification of relevant information therefrom.

SUMMARY OF THE INVENTION

The present invention is generally directed to a method, system and article of manufacture for managing query results and, more particularly, for ordering data records contained in a query result obtained in response to execution of a query against a database.

One embodiment provides a computer-implemented method of ordering query results comprising, in response to a query issued by a requesting entity: (a) receiving a list of data records ordered according to an initial order, the list of data records defining a result set for the query; (b) before outputting the result set, accessing a data source to retrieve information related to the received list of data records; (c) sorting the received list of data records on the basis of the retrieved information; and (d) outputting the sorted list of data records.

Another embodiment provides a computer-implemented method of ordering query results comprising, in response to a query issued by a requesting entity: (a) receiving a list of data records ordered according to an initial order, the list of data records defining a result set for the query; (b) before outputting the result set, determining a value variance for each data record in the list, the value variance of a given data record indicating a relative proximity between a predefined value and a corresponding value of the given data record; (c) sorting the received list of data records on the basis of the determined value variances; and (d) outputting the sorted list of data records.

Still another embodiment provides a computer-implemented method of ordering query results comprising, in response to a query issued by a requesting entity: (a) receiving a list of data records ordered according to an initial order, the list of data records defining a result set for the query; (b) before outputting the result set, identifying a subset of the data records in the list to satisfy a requested value range coverage, the requested value range coverage being defined by a predefined maximum number of data records of the list to be output, each having a corresponding value within a predefined value range; (c) sorting the received list of data records on the basis of the requested value range coverage; and (d) outputting the sorted list of data records.

Still another embodiment provides a computer-readable medium containing a program which, when executed by a processor, performs operations for ordering query results. The operations comprise, in response to a query issued by a requesting entity: (a) receiving a list of data records ordered according to an initial order, the list of data records defining a result set for the query; (b) before outputting the result set, accessing a data source to retrieve information related to the received list of data records; (c) sorting the received list of data records on the basis of the retrieved information; and (d) outputting the sorted list of data records.

Still another embodiment provides a computer-readable medium containing a program which, when executed by a processor, performs operations for ordering query results. The operations comprise, in response to a query issued by a requesting entity: (a) receiving a list of data records ordered according to an initial order, the list of data records defining a result set for the query; (b) before outputting the result set, determining a value variance for each data record in the list, the value variance of a given data record indicating a relative proximity between a predefined value and a corresponding value of the given data record; (c) sorting the received list of data records on the basis of the determined value variances; and (d) outputting the sorted list of data records.

Still another embodiment provides a computer-readable medium containing a program which, when executed by a processor, performs operations for ordering query results. The operations comprise, in response to a query issued by a requesting entity: (a) receiving a list of data records ordered according to an initial order, the list of data records defining a result set for the query; (b) before outputting the result set, identifying a subset of the data records in the list to satisfy a requested value range coverage, the requested value range coverage being defined by a predefined maximum number of data records of the list to be output, each having a corresponding value within a predefined value range; (c) sorting the received list of data records on the basis of the requested value range coverage; and (d) outputting the sorted list of data records.

Still another embodiment provides a computer system comprising a requesting entity, a data source residing in memory, and a sorting program for ordering query results obtained in response to a query issued by the requesting entity. The sorting program is configured to: (a) receive a list of data records ordered according to an initial order, the list of data records defining a result set for the query; (b) before outputting the result set, access the data source to retrieve information related to the received list of data records; (c) sort the received list of data records on the basis of the retrieved information; and (d) output the sorted list of data records.

Still another embodiment provides a computer system comprising a requesting entity and a sorting program for ordering query results obtained in response to a query issued by the requesting entity. The sorting program is configured to: (a) receive a list of data records ordered according to an initial order, the list of data records defining a result set for the query; (b) before outputting the result set, determine a value variance for each data record in the list, the value variance of a given data record indicating a relative proximity between a predefined value and a corresponding value of the given data record; (c) sort the received list of data records on the basis of the determined value variances; and (d) output the sorted list of data records.

Yet another embodiment provides a computer system comprising a requesting entity and a sorting program for ordering query results obtained in response to a query issued by the requesting entity. The sorting program is configured to: (a) receive a list of data records ordered according to an initial order, the list of data records defining a result set for the query; (b) before outputting the result set, identify a subset of the data records in the list to satisfy a requested value range coverage, the requested value range coverage being defined by a predefined maximum number of data records of the list to be output, each having a corresponding value within a predefined value range; (c) sort the received list of data records on the basis of the requested value range coverage; and (d) output the sorted list of data records.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-B are relational views of software components in one embodiment;

DETAILED DESCRIPTION OF THE PREFERRED EMBODIMENTS

Introduction

Figure 1:
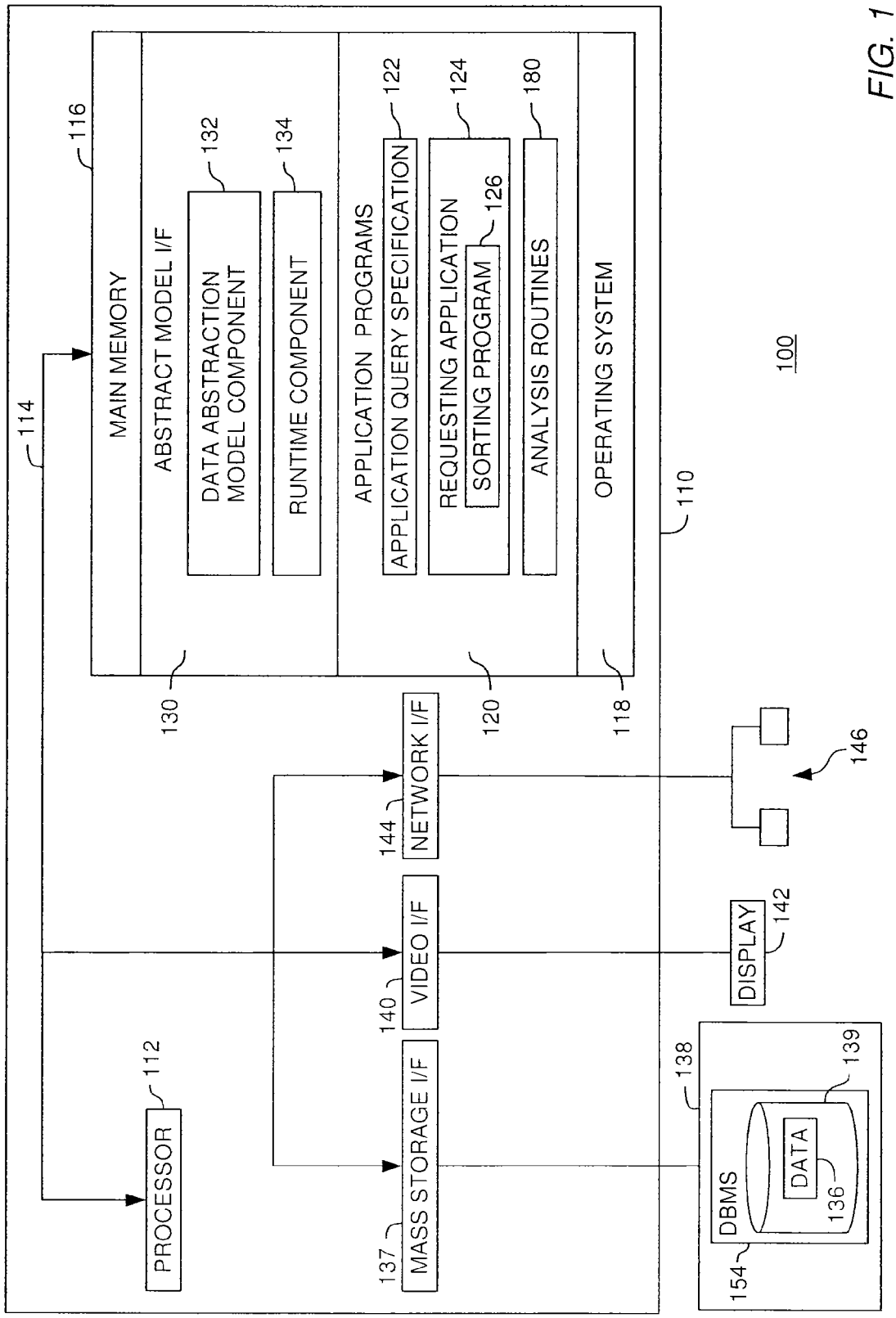
FIG. 1 is a data processing system illustratively utilized in accordance with the invention.

The present invention is generally directed to a method, system and article of manufacture for managing query results and, more particularly, for sorting data records contained in a query result. According to one aspect, a user issues a query against a database. In response to execution of the query, a list of data records defining a query result is obtained. The data records in the received list of data records are ordered according to an initial order. The data records are then sorted to provide a re-ordered query result which intelligently conveys information contained in the query result to the user.

In one embodiment, the sorting is performed on the basis of information which is related to the received list of data records. For instance, annotations associated with the data records in the list are retrieved from a suitable data source. For each data record in the list, a total number of associated annotations is counted. The total numbers can then be used as a basis for sorting the data records in the received list. By way of example, data records having the greatest total number of counted annotations can be placed on the top of a corresponding sorted list.

In another embodiment, the sorting is performed on the basis of a value variance which is determined for each data record in the list. The value variance of a given data record indicates a relative proximity between a predefined value and a corresponding value of the given data record. For instance, a given query result may include data records having values which are included within a specific value range. The value range may include a center value which can be specified as the predefined value. The value variance of each of the values from the data records in the list with respect to the predefined value (i.e., the center value) can be determined. Accordingly, a relative proximity to the predefined value can be identified for each corresponding value of the data records. Thus, data records having values with a closest relative proximity to the predefined value can be placed on the top of a corresponding sorted list.

In still another embodiment, the sorting is performed on the basis of a requested value range coverage. The requested value range coverage is defined by a predefined maximum number of data records of the list to be output according to a requested value distribution, each data record having a corresponding value within a predefined value range. For instance, a given query result may include a multiplicity of data records having corresponding values. All such corresponding values are spread over a given value range. From the multiplicity of data records, only a portion should be output according to a predefined maximum number in order to define a requested value distribution. The requested value distribution can be defined by any possible type of distribution, such as a uniform distribution (also referred to as "flat distribution") and a normal distribution (also referred to as "bell curve"). A flat distribution consists of values that are evenly distributed between upper and lower bounds. A bell curve consists of values which are selected such that the frequency of selection is weighted towards a center, or average, value within upper and lower bounds. Accordingly, the predefined maximum number of data records is selected from the multiplicity of data records such that the corresponding values of the selected data records define the requested value distribution. Thus, the one or more selected data records can be placed on the top of a corresponding sorted list.

In still another embodiment, the sorting is performed on the basis of suitability scores which are determined with respect to available analysis routines. To this end, a suitability score is determined for each data record in the list. The suitability score for a given data record indicates a relative suitability of the given data record as input to one or more analysis routines. Thus, data records which are most suitable as input to the one or more analysis routines can be placed on the top of a corresponding sorted list.

It is noted that particular embodiments described herein may refer to re-ordering of specific requested data. For example, embodiments may be described with reference to re-ordering of query results obtained in response to execution of queries against databases. However, references to re-ordering of query results are merely for purposes of illustration and not limiting of the invention. More broadly, re-ordering of any suitable data received in a list form in response to a request for the data (whether or not the request be a query, per se) is contemplated.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention.

Illustratively, the applications 120 include an application query specification 122, one or more requesting applications 124, each having a sorting program 126, and analysis routines 180. The requesting application(s) 124 (and more generally, any requesting entity, including the operating system 118) is configured to issue queries against data 136 in a database 139. Illustratively, the database 139 is shown as part of a database management system (DBMS) 154 in storage 138. The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by Extensible Markup Language (XML) queries). However, the invention is not limited to a particular schema and contemplates extension to schemas presently unknown. As used herein, the term "schema" generically refers to a particular arrangement of data.

The queries issued by the requesting application(s) 124 are defined according to the application query specification 122 included with each requesting application 124. The queries issued by the requesting application(s) 124 may be predefined (i.e., hard coded as part of the requesting application(s) 124) or may be generated in response to input (e.g., user input). In either case, the queries (referred to herein as "abstract queries") can be composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130. A runtime component 134 transforms the abstract queries into concrete queries having a form consistent with the physical representation of the data contained in the database 139. The concrete queries can be executed by the runtime component 134 against the database 139. Operation of the runtime component 134 is further described below with reference to FIGS. 7-10.

It should be noted that embodiments of the present invention can be explained below, by way of example, with reference to abstract queries which are created on the basis of a corresponding data abstraction model. However, other embodiments can be implemented using other types of queries and database representations, such as SQL or XML queries issued against data in databases having an underlying relational or XML data representation. Accordingly, the present invention is not limited to a particular query environment, including abstract queries and data abstraction models, and various different query environments and implementations are broadly contemplated In one embodiment, a result set is obtained from the data 136 in response to execution of a given query against the database 139. The result set defines a query result which is ordered according to an initial order. Using functions which are invoked by the sorting program(s) 126 of the requesting application(s) 124, the query result can be re-ordered to simplify retrieval of relevant information therefrom. Specifically, the query result can be re-ordered to facilitate retrieval of relevant information required for subsequent processing of the query result using one or more of the analysis routines 180. Operation and interaction of the requesting application(s) 124 and the analysis routines 180 are further described below with reference to FIGS. 2A-6C.

It should be noted that the sorting program(s) 126 are illustrated as an integral part of the requesting application(s) 124 for purposes of illustration. However, it should be noted that the sorting program(s) 126 can be implemented as separate application(s) which is independent of the requesting application(s) 124. Accordingly, any suitable implementation of the requesting application(s) 124 and the sorting program(s) 126 is broadly contemplated.

Referring now to FIG. 2A, a block diagram of a computing environment for re-ordering of requested data in one embodiment is shown. Illustratively, the computing environment includes the requesting application(s) 124 having the sorting program(s) 126, the database 139 having the data 136, the display device 142 and the analysis routines 180 of FIG. 1, as well as a user interface 210.

By way of example, the requesting application(s) 124 issues a data request 220 (e.g., a query) against the data 136 in the database 139. In one embodiment, the data request 220 is created by a user using the user interface 210. The data request 220 is executed against the database 139 to obtain a corresponding result set of data from the data 136 (e.g., a query result) using the DBMS 154.

In response to the data request 220, requested data 230 defining the corresponding result set is identified from the data 136. The requested data 230 is ordered according to an initial order and returned to the requesting application(s) 124. In one embodiment, the requested data 230 is presented as an ordered list of data records.

Using functions invoked by the sorting program(s) 126, the requested data 230 is re-ordered, i.e., the data records in the ordered list are sorted in order to reduce the complexity of retrieving relevant information therefrom. Sorting the data records of a received list of data records according to predefined criteria is described in more detail below with reference to FIGS. 2B-6C. After sorting the data records in the ordered list, the sorted requested data 240 is output to the display device 142 for display. Accordingly, the sorted requested data 240 can be presented on the display device 142 as a sorted list of data records. The sorted requested data 240 can subsequently be processed using one or more of the analysis routines 180.

In one embodiment, the sorting program(s) 126 sorts the data records in the ordered list on the basis of related information 258 which is retrieved from a corresponding data source 252. In order to retrieve the related information 258, the sorting program(s) 126 issues a sort request 222 against the data source 252. The sort request 252 is executed against the data source 252 using a DBMS 256 which manages the data source 252.

According to one aspect, the requesting application(s) 124 and the sorting program(s) 126 are implemented as a single, integrated software product resident at the server-side or the client-side. Furthermore, the sorting can be done by a client-side application (e.g., the requesting application(s) 124 having the sorting program(s) 126) and the requested data 230 is received from a server-side database (e.g., the database 139). However, it should be noted that alternative embodiments are contemplated. For instance, the sorting program(s) 126 can be implemented by a server-side application in which case the sorting can be done on a server machine having the database 139. In another embodiment, the sorting program(s) 126 and the database 139 can be resident on a common computer system.

Figure 2B:
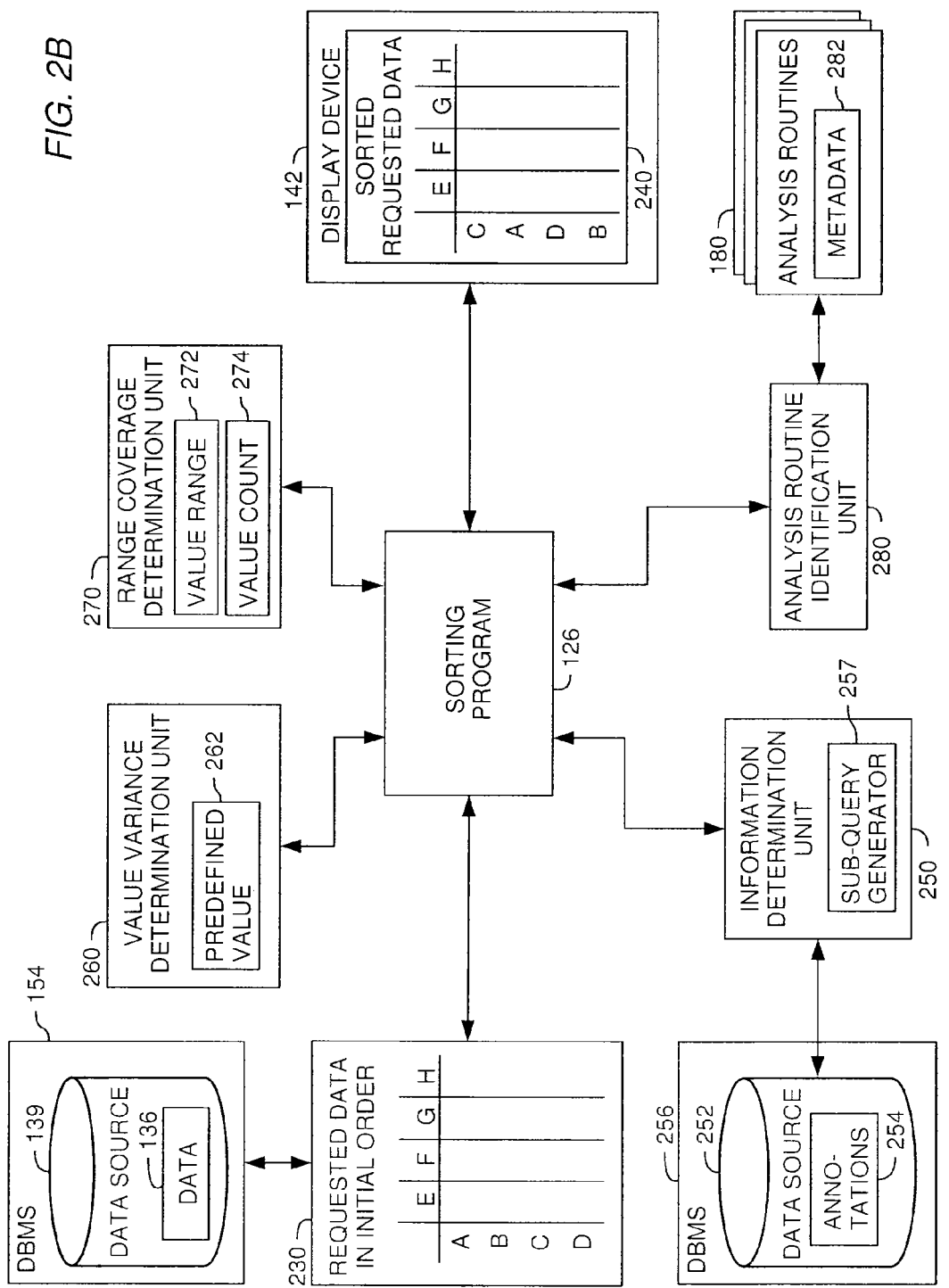

Referring now to FIG. 2B, exemplary functions which can be called by the sorting program(s) 126 of FIG. 2A for re-ordering the requested data 230 are shown in more detail. Specifically, the sorting program(s) 126 can invoke various functions which are configured for pre- and post-processing of the data request 220 and the requested data 230 of FIG. 2A.

As was noted above with reference to FIG. 2A, the requested data 230 is retrieved from the data 136 in the database 139 using the DBMS 154. According to one aspect, the requested data 230 is presented in a tabular form having a plurality of rows and columns. Illustratively, the plurality of rows includes rows "A", "B", "C" and "D", and the plurality of columns includes columns "E", "F", "G" and "H". By way of example, the plurality of rows is shown having an initial order "ABCD" and the plurality of columns is shown having an order "EFGH". Each of the rows "A", "B", "C" and "D" represents a data record, so that the requested data 230 defines an ordered list of data records having the initial order "ABCD".

The sorting program(s) 126 receives the ordered list of data records (i.e., the requested data 230) as input and sorts the data records "A", "B", "C" and "D" of the received list. Illustratively, the sorting program(s) 126 sorts the data records "A", "B", "C" and "D" of the requested data 230 such that the sorted data records have the order "CADB" in the sorted requested data 240. After sorting the data records, the sorting program(s) 126 outputs the sorted list of the data records (i.e., the sorted requested data 240) to the display device 142. Exemplary embodiments of operations for sorting data records of a received list of data records are described below with reference to FIGS. 3-6C.

Sorting on the Basis of Related Information

More specifically, in the embodiment illustrated in FIG. 2B, the re-ordering of the requested data 230 is performed on the basis of information (e.g., related information 258 of FIG. 2A) which is related to the received list of data records "A", "B", "C" and "D" defining the requested data 230. In order to determine the related information, the sorting program(s) 126 invokes an information determination unit 250 having a sub-query generator 257. It should be noted that the information determination unit 250 is represented as a separate unit only by way of example and not for limiting the invention accordingly. In other words, the information determination unit 250 can also be implemented as an integral part of the sorting program(s) 126 or some other suitable system program.

The information determination unit 250 accesses a data source 252 to determine the related information therefrom. To this end, the sub-query generator 257 generates the sort request 222 of FIG. 2A which is issued against the data source 252 for retrieving the related information using the DBMS 256. In the illustrated example, the data source 252 includes annotations 254 associated with the data records "A", "B", "C" and "D". However, it should be noted that annotations are merely one example of information related to data records. Any suitable related information including annotations can be used as a basis for re-ordering the requested data 230. More generally, any reference to the data records can be used as a basis for the re-ordering. Accordingly, all such suitable types of related information are broadly contemplated. Furthermore, the annotations themselves can be classified based on an organization type in which the creators of the annotations are working. For example, data records which have been annotated by individuals working in the same technological field of study can be preferred to general annotations. Moreover, the annotations can be ranked on the basis of hierarchical positions of the creators of the annotations. For instance, for a researcher who performs a study on a liver disease, annotations made by a chief site specialist are certainly preferred to those of assistants.

According to one aspect, the information determination unit 250 counts a total number of associated annotations for each of the data records of the requested data 230. The counted total numbers are then used as a basis for sorting the data records. By way of example, assume that for the data record "C" a total number of 76 associated annotations is counted. Similarly, a total number of 62 annotations is counted for the data record "A", a total number of 43 annotations is counted for the data record "D", and a total number of 15 annotations is counted for the data record "B". Assume further that the data record having the greatest total number of annotations is placed on the top of the sorted list of data records defining the sorted requested data 240. Accordingly, the data records "A", "B", "C" and "D" are programmatically sorted in the sorted requested data 240 according to the order "CADB", as illustrated. An exemplary method for re-ordering the requested data 230 on the basis of information which is related to the received list of data records defining the requested data 230 is described below with reference to FIG. 3.

Figure 3:
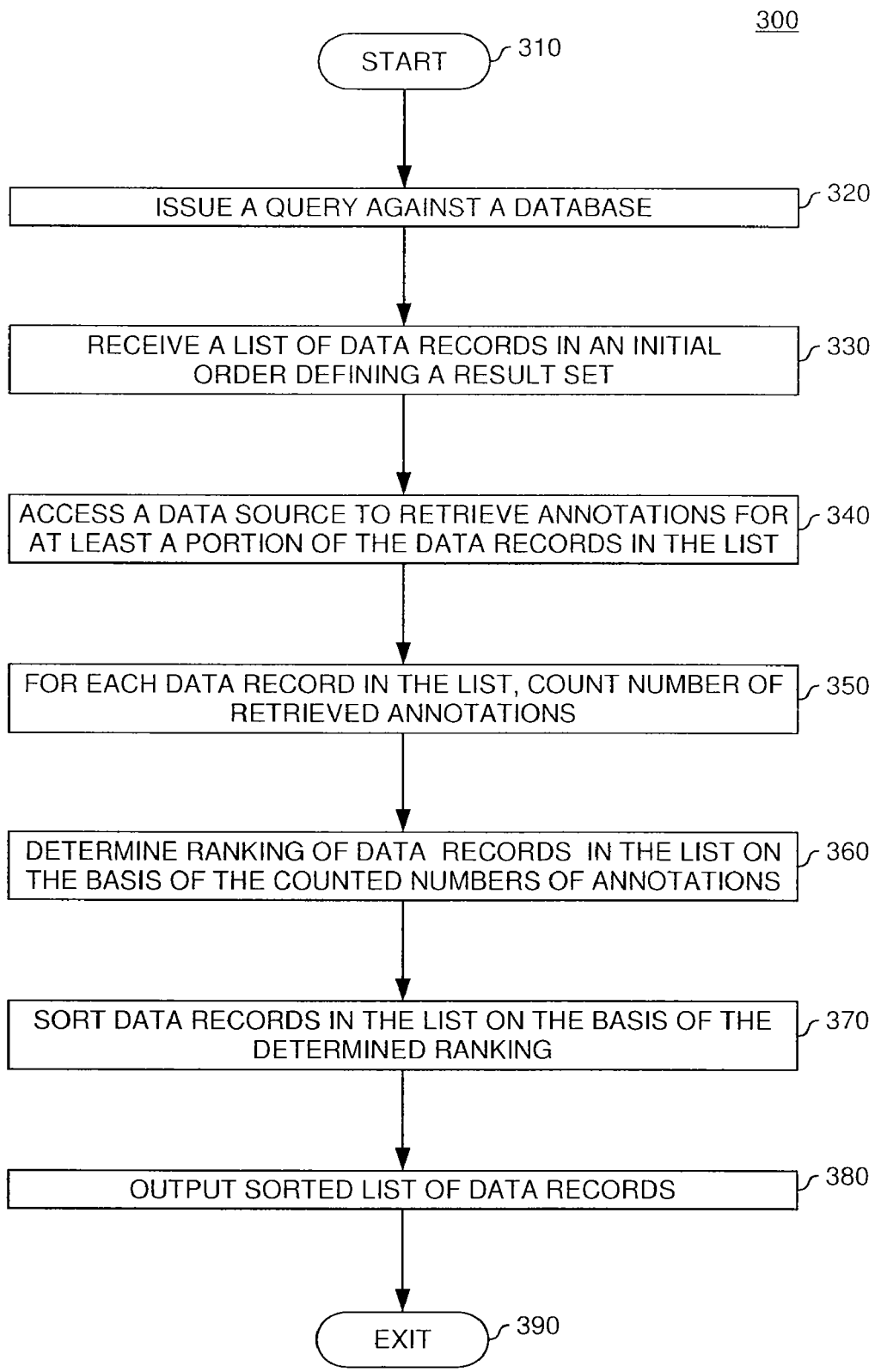
FIG. 3 is a flow chart illustrating sorting of data records contained in a query result in one embodiment.

Referring now to FIG. 3, one embodiment of a method 300 for re-ordering requested data (e.g., requested data 230 of FIG. 2B) on the basis of information (e.g., annotations 254 of FIG. 2B) which is related to the requested data is shown. The requested data is obtained in response to execution of a corresponding data request against data in a database (e.g., data 136 of database 139 of FIG. 2A). At least part of the steps of the method 300 can be performed by a suitable requesting entity (e.g., requesting application(s) 124 of FIG. 2A) and suitable functionalities of an associated sorting program(s) (e.g., sorting program(s) 126 of FIG. 2B).

By way of example, the method 300 is explained with respect to a data request being implemented as a query against the data in the database for purposes of illustration. In this case, the requested data is a result set of data which defines a query result.

Method 300 starts at step 310. At step 320, the query is issued by the suitable requesting entity. The issued query is executed against the data in the database. An exemplary query is shown in Table I below. For simplicity, the exemplary query of Table I is described in natural language without reference to a particular query language. Thus, it is understood that any suitable query language, known or unknown, can be used to create the query of Table I.

TABLE I

QUERY EXAMPLE

```
001 FIND
002     ID, Name, Age
003 SORT BY
004     number of associated annotations
```

Illustratively, the exemplary query shown in Table I includes data selection criteria in lines 001-002. The data selection criteria include a result field specification (line 002) which specifies three result fields for which information is to be returned in the query result. Specifically, in line 002 the result fields "ID", "Name" and "Age" are specified. The exemplary query further includes sorting criteria in lines 003-004. The sorting criteria indicate that all data records in the query result should be sorted according to counted numbers of annotations associated with the data records (line 004).

Assume now that data related to the result fields "ID", "Name" and "Age" of the exemplary query of Table I is included with a database table "Demographic". An exemplary "Demographic" table is shown in Table II below.

TABLE II

EXEMPLARY DATABASE TABLE "DEMOGRAPHIC"

| 001 | ID | Name | Age |
|---|---|---|---|
| 002 | 3 | Renee | 24 |
| 003 | 1 | Karl | 54 |
| 004 | 2 | Kris | 49 |

Illustratively, the exemplary database table "Demographic" includes an "ID", "Name" and "Age" column. The "ID" column contains a unique identifier for each of the data records included with lines 002-004. The "Name" column includes names of individuals and the "Age" column contains information about the age of the corresponding individuals.

Assume further that the annotations required for the sorting of the query result are included with a database table named "Annotations". An exemplary "Annotations" table is shown in Table III below.

TABLE III

EXEMPLARY DATABASE TABLE "ANNOTATIONS"

| 001 | Note_ID | Patient_ID | Date | Comment |
|---|---|---|---|---|
| 002 | 453 | 1 | 1 Feb. 2004 | Karl has three broken toes |
| 003 | 454 | 2 | 1 Mar. 2004 | Kris has a bad sunburn |
| 004 | 455 | 1 | 1 Apr. 2004 | Karl has a cut finger |

Illustratively, the exemplary database table "Annotations" includes a "Node_ID", "Patient_ID", "Date" and "Comment" column. The "Node_ID" column contains a unique identifier for each of the data records included with lines 002-004. The "Patient_ID" column includes patient identifiers according to the "ID" column of the "Demographic" table of Table II above. The "Date" column contains indications of dates on which, for example, a corresponding diagnosis has been established for a given patient. The "Comment" column contains annotations with respect to the established diagnoses.

In one embodiment, executing the query at step 320 includes generating a data query (e.g., data request 220 of FIG. 2A) and a sorting query (e.g., sort request 222 of FIG. 2A) using a suitable sub-query generator. More specifically, the issued query includes: (i) data selection criteria (e.g., data selection criteria in lines 001-002 of Table I) configured to select data records defining the query result from the data in the database, and (ii) sorting criteria (e.g., sorting criteria in lines 003-004 of Table I) configured to specify the information related to the data records of the query result. The data query is generated on the basis of the data selection criteria and the sorting query is generated on the basis of the sorting criteria. Accordingly, the data query is used to determine the query result in an initial order on the basis of the data selection criteria. The sorting query is used to sort the data records in the determined query result on the basis of the sorting criteria. In the given example, the data query shown in Table IV below can be generated from the exemplary query of Table I above using the suitable sub-query generator.

TABLE IV

DATA QUERY EXAMPLE

```
001 FIND
002     ID, Name, Age
003 FROM
004     Demographic
```

Illustratively, the exemplary data query shown in Table IV includes data selection criteria in lines 001-002 which correspond to the data selection criteria in lines 001-002 of Table I. The exemplary data query further includes a specification of the database table which contains the requested data (lines 003-004), i.e., the "Demographic" table of Table II above. Assume for simplicity that the suitable sub-query generator retrieves the table named "Demographic" from the issued query of Table I above. Furthermore, the sorting query shown in Table V below can be generated from the exemplary query of Table I above.

TABLE V

SORTING QUERY EXAMPLE

```
001 FIND
002     Patient_ID, count(comment)
003 FROM
004     Annotations
005 GROUP BY
006     Patient_ID
```

Illustratively, the exemplary sorting query shown in Table V includes data selection criteria in lines 001-002 for selection of the required related information, and a specification of the database table which contains the related information in lines 003-004, i.e., the "Annotations" table of Table III above. According to one aspect, a corresponding rule may indicate to the suitable sub-query generator (e.g., sub-query generator 257 of FIG. 2B) that the related information about annotations is contained in the database table named "Annotations". Furthermore, the sorting criteria "SORT BY number of associated annotations" in lines 003-004 of Table I specify that the query result should be sorted with respect to a number of annotations associated with each data record contained in the query result. As the data records in the query result are identified by patient identifiers ("Patient_ID"), annotations ("comment" in line 002) with respect to patients which are identified by corresponding patient identifiers ("Patient_ID" in line 002) are retrieved. Furthermore, all retrieved annotations are counted for each data record associated with one of the retrieved patient identifiers ("count(comment)" in line 002). Moreover, a ranking of the counted retrieved annotations is established according to the sorting query of Table V by grouping the counted numbers of annotations (lines 005-006) per patient.

At step 330, the query result in an initial order is received. In one embodiment, the query result is presented in a list form having a plurality of data records. In the given example, receiving the query result in the initial order corresponds to receiving a query result (hereinafter referred to as "data query result") obtained in response to execution of the data query of Table IV against the exemplary "Demographic" table of Table II. Accordingly, the data query result shown in Table VI below is received.

TABLE VI

EXEMPLARY DATA QUERY RESULT

| 001 | ID | Name | Age |
|---|---|---|---|
| 002 | 3 | Renee | 24 |
| 003 | 1 | Karl | 54 |
| 004 | 2 | Kris | 49 |

Note that in the given example the exemplary data query result of Table VI corresponds to the database table shown in Table II above.

At step 340, a data source (e.g., data source 252 of FIG. 2B) is accessed to retrieve annotations (e.g., one or more of the annotations 254 of FIG. 2B) for at least a portion of the data records contained in lines 002-004 of the data query result of Table VI above. At step 350, a total number of retrieved annotations is counted for each one of the data records. In the given example, steps 340 and 350 can be accomplished by executing the sorting query of Table V against the "Annotations" table of Table III. Accordingly, the exemplary query result (hereinafter referred to as "sorting query result") shown in Table VII below is received.

TABLE VII

EXEMPLARY SORTING QUERY RESULT

| 001 | Patient_ID | Number of Annotations |
|---|---|---|
| 002 | 1 | 2 |
| 003 | 2 | 1 |

Note that according to line 002 the patient identifier "1" has two associated annotations (in lines 002 and 004 of Table II). According to line 003, the patient identifier "2" has only one associated annotation (in line 003 of Table II).

At step 360, a ranking of the data records in lines 002-004 of the data query result in Table VI above is determined on the basis of the counted total numbers of retrieved associated annotations. To this end, the data query result of Table VI can be augmented with the exemplary sorting query result of Table VII, in the given example. Accordingly, the augmented query result shown in Table VIII below is obtained.

TABLE VIII

EXEMPLARY AUGMENTED QUERY RESULT

| 001 | ID | Name | Age | Number of Annotations |
|---|---|---|---|---|
| 002 | 3 | Renee | 24 | 0 |
| 003 | 1 | Karl | 54 | 2 |
| 004 | 2 | Kris | 49 | 1 |

Note that in the given example the exemplary augmented query result of Table VIII corresponds to the data query result shown in Table VI above, wherein a column containing the counted numbers of annotations according to Table VII has been inserted. Furthermore, as can be seen from the "Number of Annotations" column, the following ranking can be established: (1) the data record of line 003 has the most associated annotations, (2) the data record in line 004 has the second most associated annotations, and (3) the data record in line 002 has no associated annotations at all.

By way of example, the above ranking is performed on the basis of the counted numbers of annotations. However, as was noted above it should be noted that types and/or attributes of the annotations can also be considered when establishing the ranking. For instance, the annotations can be weighted based on an organization hierarchy or type of the creators of the annotations. Furthermore, the annotations can be weighted so that some annotations are weighted relatively more heavily than others. For example, assume that the annotation in line 003 of Table III which is related to "Kris" was made by a chief site specialist while the annotations in lines 002 and 004 of Table II, which are both related to "Karl", were made by an assistant. In this case, it might be desirable to weight the annotation made by the chief site specialist such that the one annotation associated with "Kris" is considered more important than the two annotations associated with "Karl".

At step 370, the data records in the received query result (i.e., data query result of Table VI) are sorted on the basis of the determined ranking. Accordingly, the exemplary sorted query result shown in Table IX below is obtained.

TABLE IX

EXEMPLARY SORTED QUERY RESULT

| 001 | ID | Name | Age |
|---|---|---|---|
| 002 | 1 | Karl | 54 |
| 003 | 2 | Kris | 49 |
| 004 | 3 | Renee | 24 |

Note that in the given example the data records in lines 002-004 of Table IX are sorted according to the above described ranking. Accordingly, the data record of line 003 of Table VI is presented on the top of the exemplary sorted query result, i.e., in line 002 of Table IX, as this data record has the greatest counted number of associated annotations.

At step 380, the sorted list of data records (e.g., sorted requested data 240 of FIG. 2B) is output. For instance, the sorted list is output for display on a display device (e.g., display device 142 in FIG. 2B). In other words, in the given example the exemplary sorted query result of Table IX is output. Method 300 then exits at step 390.

Sorting on the Basis of Value Variances

Referring now back to FIG. 2B, the re-ordering of the requested data 230 is performed in another embodiment on the basis of a value variance which is determined for each of the data records of the requested data 230. The value variance of a given data record indicates a relative proximity between a predefined value 262 and a corresponding value of the given data record.

In order to determine the value variance for each data record of the requested data 230, the sorting program(s) 126 illustratively invokes a value variance determination unit 260. It should be noted that the value variance determination unit 260 is represented as a separate unit only by way of example and not for limiting the invention accordingly. In other words, the value variance determination unit 260 can also be implemented as an integral part of the sorting program(s) 126 or some other suitable system program.

The value variance determination unit 260 illustratively includes the predefined value 262. According to one aspect, the predefined value 262 can be provided by a user using a suitable user interface (e.g., user interface 210 of FIG. 2A). In one embodiment, each one of the data records of the requested data 230 has a particular value of a type which corresponds to an underlying value type of the predefined value 262. For instance, each one of the data records may include a particular value related to a hemoglobin test and the predefined value 262 may represent a user-specified value of interest for hemoglobin tests. More specifically, assume that the particular values of the data records are hemoglobin test result values between 12 and 14. Assume further that a user specifies 13.5 as a central or ideal interest value, i.e., the predefined value 262. Thus, the data records having particular values which are the most close to the central or ideal interest value of 13.5 can be identified from the requested data 230.

To this end, the value variance determination unit 260 determines the value variance of the particular value of each of the data records of the requested data 230 with respect to the predefined value 262. Thus, for each one of the data records a relative proximity between the corresponding particular value and the predefined value 262 can be identified. According to one aspect, the data records having the particular values with the closest relative proximity to the predefined value 262 are programmatically placed on the top of the sorted list of data records defining the sorted requested data 240. An exemplary method for re-ordering the requested data 230 on the basis of a value variance which is determined for each of the data records of the requested data 230 is described below with reference to FIG. 4.

Figure 4:
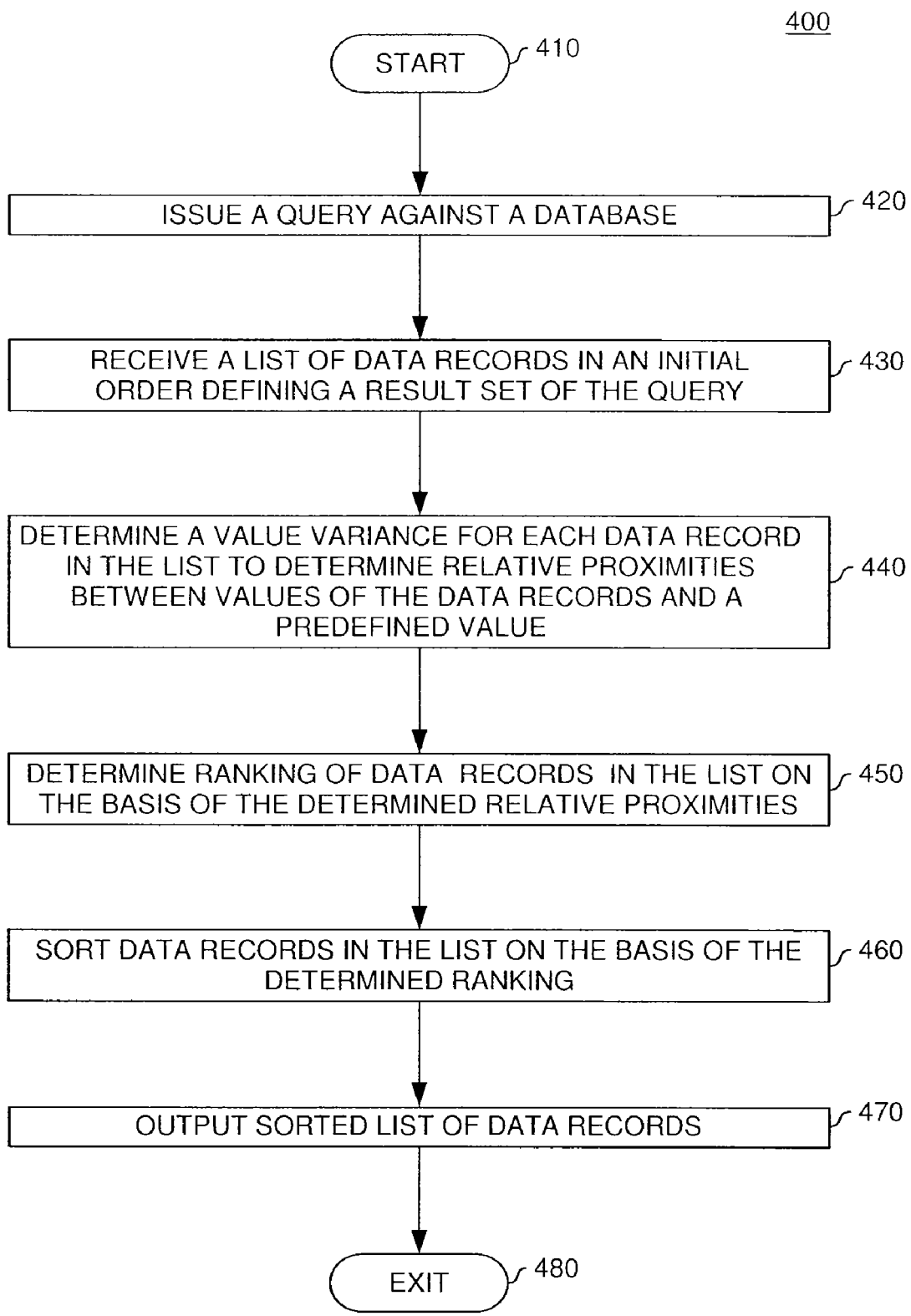
FIG. 4 is a flow chart illustrating sorting of data records contained in a query result in another embodiment.

Referring now to FIG. 4, one embodiment of a method 400 for re-ordering requested data (e.g., requested data 230 of FIG. 2B) on the basis of value variances is shown. The requested data is obtained in response to execution of a corresponding data request (e.g., data request 220 of FIG. 2A) against data in a database (e.g., data 136 of database 139 of FIG. 2A). Similarly to the method 300 of FIG. 3, the method 400 is explained by way of example with respect to a query issued against the data in the database in order to obtain a corresponding query result. At least part of the steps of the method 400 can be performed by a suitable requesting entity (e.g., requesting application(s) 124 of FIG. 2A) and suitable functionalities of an associated sorting program(s) (e.g., sorting program(s) 126 of FIG. 2B). Method 400 starts at step 410.

At step 420, the query is issued by a suitable requesting entity (e.g., requesting application(s) 124 of FIG. 2A). The issued query is executed against the data in the database. An exemplary query is shown in Table X below. For simplicity, the exemplary query of Table X is described in natural language without reference to a particular query language. Thus, it is understood that any suitable query language, known or unknown, can be used to create the query of Table X.

TABLE X

QUERY EXAMPLE

| | |
|---|---|
| 001 | FIND |
| 002 | Patient_ID, Hemoglobin |
| 003 | SORT BY |
| 004 | proximity to Hemoglobin = 34 |

Illustratively, the exemplary query shown in Table X includes data selection criteria in lines 001-002. The data selection criteria include a result field specification (line 002) which specifies two result fields for which information is to be returned in the query result. Specifically, in line 002 the result fields "Patient_ID" and "Hemoglobin" are specified. The exemplary query further includes sorting criteria in lines 003-004. The sorting criteria indicate that all data records in the query result should be sorted with respect to a predefined Hemoglobin value (e.g., predefined value 262 of FIG. 2B) of "34" (line 004). More specifically, each Hemoglobin test value included with a data record of the query result is compared with the predefined Hemoglobin value to identify a relative proximity thereto.

Assume now that information related to the result fields "Patient_ID" and "Hemoglobin" of the exemplary query of Table X is included with a database table "Tests". An exemplary "Tests" table is shown in Table XI below.

TABLE XI

EXEMPLARY DATABASE TABLE "TESTS"

| | Patient_ID | Date | Hemoglobin |
|---|---|---|---|
| 001 | | | |
| 002 | 1 | 1 Feb. 2004 | 29 |
| 003 | 1 | 16 Jun. 2004 | 23 |
| 004 | 3 | 5 May 2004 | 35 |
| 005 | 2 | 12 Aug. 2004 | 45 |
| 006 | 2 | 19 Oct. 2004 | 33 |

Illustratively, the exemplary database table "Tests" includes a "Patient_ID", "Date" and "Hemoglobin" column. By way of example, the "Patient_ID" column includes patient identifiers according to the "ID" column of the "Demographic" table of Table II above. The "Date" column contains exemplary dates at which a corresponding Hemoglobin test has been performed on a given patient. The "Hemoglobin" column includes Hemoglobin test values which have been determined at the indicated dates.

In one embodiment, executing the query at step 420 includes identifying the data selection criteria and the sorting criteria from the issued query. Executing the query further includes generating a data query on the basis of the identified data selection criteria and executing the data query against the database. In the given example, the data selection criteria "FIND Patient_ID, Hemoglobin" can be identified from the issued query (lines 001-002 of Table X). Furthermore, the sorting criteria "SORT BY proximity to Hemoglobin=34" can be identified from the issued query (lines 003-004 of Table X). On the basis of the identified data selection criteria, the data query shown in Table XII below can be generated.

TABLE XII

DATA QUERY EXAMPLE

| | |
|---|---|
| 001 | FIND |
| 002 | Patient_ID, Hemoglobin |
| 003 | FROM |
| 004 | Tests |

Illustratively, the exemplary data query shown in Table XII includes the data selection criteria of lines 001-002 of Table X. The exemplary data query further includes a specification of the database which contains the requested data (lines 003-004), i.e., the "Tests" table of Table XI above.

At step 430, the query result in an initial order is received. Receiving the query result in the initial order corresponds to receiving a data query result obtained in response to execution of the data query of Table XII against the exemplary "Tests" table of Table XI. The data query result shown in Table XIII below is received in the given example.

TABLE XIII

EXEMPLARY DATA QUERY RESULT

| 001 | Patient_ID | Hemoglobin |
|---|---|---|
| 002 | 1 | 29 |
| 003 | 1 | 23 |
| 004 | 3 | 35 |
| 005 | 2 | 45 |
| 006 | 2 | 33 |

Note that in the given example the exemplary data query result of Table XIII corresponds to the database table shown in Table XI above, where the "Date" column has been removed.

At step 440, a value variance is determined for each one of the data records contained in the data query result of Table XIII to determine the relative proximities. Illustratively, the data query result can be augmented with a column indicating the determined value variances. Accordingly, the augmented query result shown in Table XIV below is obtained.

TABLE XIV

EXEMPLARY AUGMENTED QUERY RESULT

| 001 | Patient_ID | Hemoglobin | Value Variance |
|---|---|---|---|
| 002 | 1 | 29 | 5 |
| 003 | 1 | 23 | 11 |
| 004 | 3 | 35 | 1 |
| 005 | 2 | 45 | 11 |
| 006 | 2 | 33 | 1 |

Note that in the given example the exemplary augmented query result of Table XIV corresponds to the data query result shown in Table XIII above, wherein a column containing the determined value variances has been inserted. Each value variance is defined by the difference between the returned Hemoglobin value and the predefined Hemoglobin value. As can be seen from Table XIV, the data record in line 005 has a Hemoglobin value of "45". Thus, the value variance for this data record can be determined according to one aspect by subtracting the predefined Hemoglobin value of "34" therefrom, i.e., 45−34=11.

At step 450, a ranking of the data records is determined on the basis of the determined relative proximities, i.e., the determined value variances. As can be seen from the "Value Variance" column of Table XIV, the following ranking can be established: (1) the data records of lines 003 and 006 have a value variance of "1" and, thus, the closest relative proximity with respect to the predefined Hemoglobin value, (2) the data record of line 001 has a value variance of "5" and, thus, the second closest relative proximity, and (3) the data records of lines 002 and 005 have a value variance of "11" and, thus, the farthest relative proximity.

At step 460, the data records in the data query result of Table XIII are sorted on the basis of the determined ranking. Accordingly, the exemplary sorted query result shown in Table XV below is obtained.

TABLE XV

EXEMPLARY SORTED QUERY RESULT

| 001 | Patient_ID | Hemoglobin |
|---|---|---|
| 002 | 2 | 33 |
| 003 | 3 | 35 |
| 004 | 1 | 29 |
| 005 | 1 | 23 |
| 006 | 2 | 45 |

Note that in the given example the data record of line 006 of the data query result of Table XIII is presented on the top of the exemplary sorted query result, i.e., in line 002 of Table XV, as the Hemoglobin test value of this data record has the closest relative proximity to the predefined Hemoglobin value.

At step 470, the sorted list of data records (e.g., sorted requested data 240 of FIG. 2B) is output. In the given example, the exemplary sorted query result of Table XV is output. Method 400 then exits at step 480.

Sorting on the Basis of a Requested Value Range Coverage

Referring now back to FIG. 2B, the re-ordering of the requested data 230 is performed in still another embodiment on the basis of a requested value range coverage. The requested value range coverage is defined by a predefined maximum number 274 "VALUE COUNT" of data records of the requested data 230 to be output. Each data record has an associated particular value and the particular value of each of the outputted data records must be included within a predefined value range 272 "VALUE RANGE". Accordingly, in one embodiment the predefined maximum number 274 of data records having associated particular values within the predefined value range 272 is programmatically selected and output.

For instance, assume a researcher who wants to conduct a study on the effects of alcohol on the liver of humans dependent on the weight of corresponding test persons. Assume now that the requested data 230 includes data records having particular values for the weight of respective individuals. Assume further that the researcher requires 100 test persons and that the 100 test persons should have weights which are included in a value range of 100 pounds-250 pounds. To this end, the researcher using a suitable user interface (e.g., user interface 210 of FIG. 2A) defines the predefined maximum number 274 to be 100 and the predefined value range 272 to be 100 pounds-250 pounds. Assume now that the requested data 230 includes 1000 data records having particular values within the predefined value range 272. Thus, by specifying the requested range coverage to retrieve the 100 test persons, 100 data records would be selected programmatically and output. The 100 data records can be selected arbitrarily to satisfy the requested value range coverage.

More specifically, in order to determine a requested value range coverage for the data records of the requested data 230, the sorting program(s) 126 illustratively invokes a range coverage determination unit 270 having the predefined value range 272 and the predefined maximum number 274. It should be noted that the range coverage determination unit 270 is represented as a separate unit only by way of example and not for limiting the invention accordingly. In other words, the range coverage determination unit 270 can also be implemented as an integral part of the sorting program(s) 126 or some other suitable system program.

It should be noted that an arbitrary selection of the 100 data records in the given example may result in selection of 100 individuals all having an identical weight of 175 pounds, for example. However, as 100 individuals having an identical weight are not considered being representative of the predefined value range 272, the user can use the suitable user interface in one embodiment to specify how many data records having an identical associated particular value should be output at maximum. For instance, the user can specify that not more than five data records associated with individuals having an identical weight should be output. Accordingly, in the given example the 100 selected data records would represent individuals having at least 20 different weights within the predefined value range 272.

In another embodiment, the particular values of the outputted data records must define a requested value distribution in the predefined value range 272. As was noted above, the requested value distribution can be defined by any possible type of distribution, such as a flat distribution and a bell curve. However, it should be noted that a flat distribution and a bell curve are merely described by way of example and that other distribution types can also be requested, such as an inverted bell curve or a negative exponential distribution. Accordingly, all such distributions are broadly contemplated. For instance, assume that in the given example the researcher requires 100 test persons having weights which are evenly spread out over the value range of 100 pounds-250 pounds, so that the weights of the 100 test persons can be considered as being representative of the complete value range. Thus, by specifying the requested range coverage to retrieve the 100 test persons such that the weights of the retrieved test persons define a flat distribution over the value range of 100 pounds-250 pounds, the best fit of representative data records would be selected programmatically.

In this case, the range coverage determination unit 270 determines for each of the data records of the requested data 230 whether the particular value of the data record is included within the predefined value range 272. From all data records having their particular value included within the predefined value range 272, a total number of data records is selected that is equal to, or at least does not exceed, the predefined maximum number 274 (in this example, 100). The particular values of the selected data records define the requested value distribution.

In one embodiment, the requested value distribution is represented as a histogram having one or more value windows, each having a specified value range defining a granularity of the value window. The granularity can be user-specified or system and/or application specific. According to one aspect, a user can specify a histogram using the suitable user interface. For instance, in the given example the user can specify a histogram representing a bell curve. By way of example, the user may divide the value range of 100 pounds-250 pounds into five different value windows, such as (1) 100 pounds-129 pounds, (2) 130 pounds to 159 pounds, (3) 160 pounds-189 pounds, (4) 190 pounds-219 pounds, and (5) 220 pounds to 250 pounds. Furthermore, the user may specify that from the 100 requested test persons (i) 15 persons should have weights within the value windows (1) and (5), respectively, (ii) 40 persons should have weights within the value windows (2) and (4), respectively, and 90 persons should have weights within the value window (3). Accordingly, the weights of all selected data records would define a bell curve.

The one or more selected data records can, for instance, be placed on the top of the sorted list defining the sorted requested data 240. Alternatively, only the selected data records can be displayed in the sorted list on the display device 142, while the remaining data records are hidden to the user. An exemplary method for re-ordering the requested data 230 on the basis of a requested value range coverage is described below with reference to FIGS. 5A-B.

Figure 5A:
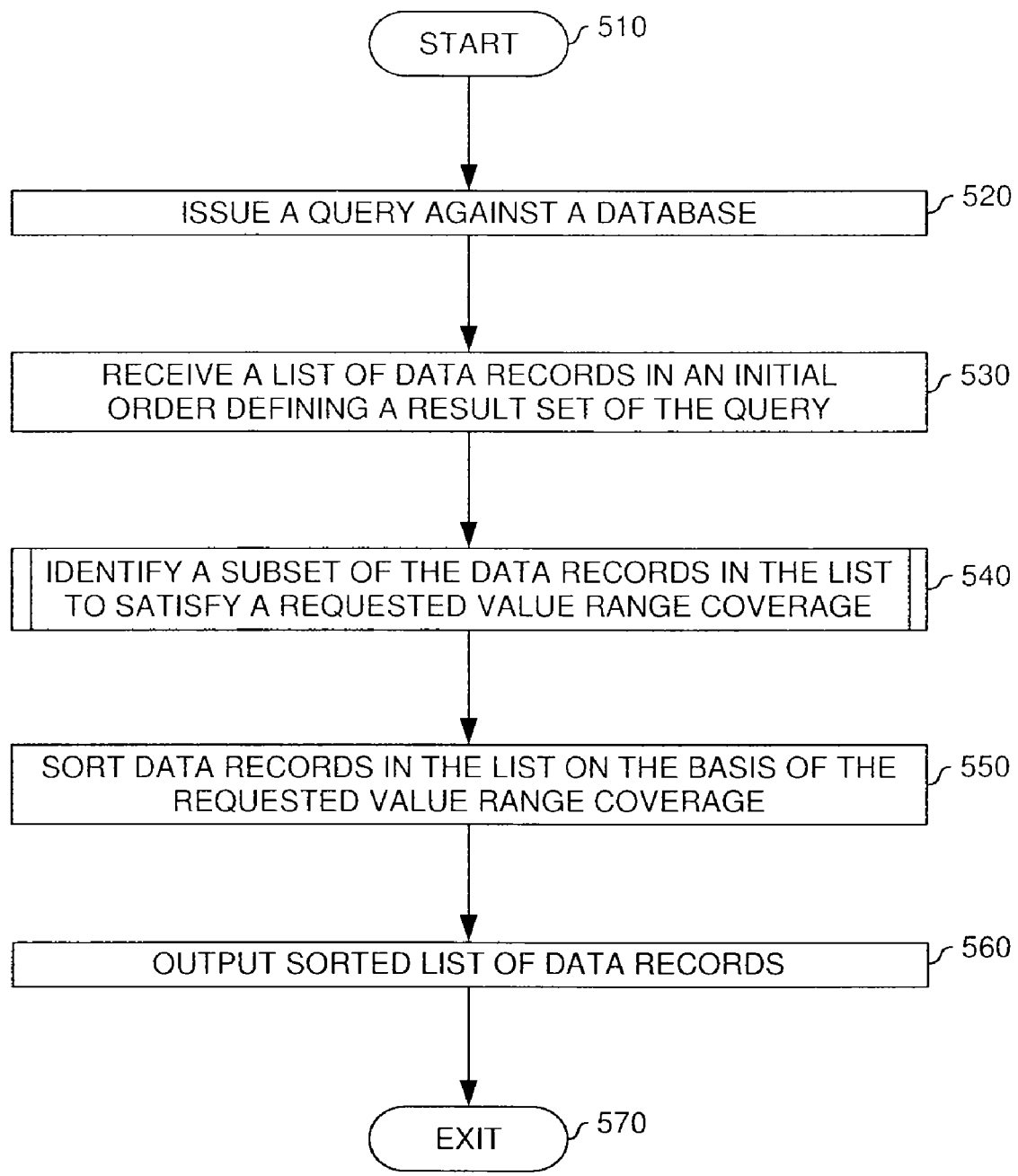
FIGS. 5A-B are flow charts illustrating sorting of data records contained in a query result in still another embodiment.

Referring now to FIG. 5A, one embodiment of a method 500 for re-ordering requested data (e.g., requested data 230 of FIG. 2B) on the basis of a requested value range coverage is shown. The requested data is obtained in response to execution of a corresponding data request (e.g., data request 220 of FIG. 2A) against data in a database (e.g., data 136 of database 139 of FIG. 2A). Similarly to the methods 300 and 400 of FIGS. 3 and 4, the method 500 is explained by way of example with respect to a query issued against the data in the database in order to obtain a corresponding query result. At least part of the steps of the method 500 can be performed by a suitable requesting entity (e.g., requesting application(s) 124 of FIG. 2A) and suitable functionalities of an associated sorting program(s) (e.g., sorting program(s) 126 of FIG. 2B). Method 500 starts at step 510.

At step 520, the query is issued by a suitable requesting entity (e.g., requesting application 124 of FIG. 2A). The issued query is executed against the data in the database. An exemplary query is shown in Table XVI below. For simplicity, the exemplary query of Table XVI is described in natural language without reference to a particular query language. Thus, it is understood that any suitable query language, known or unknown, can be used to create the query of Table XVI.

TABLE XVI

| QUERY EXAMPLE |
|---|
| 01  FIND |
| 02      Patient_ID, Hemoglobin |
| 03  SORT BY |
| 04      spread of Hemoglobin |
| 05  RETURN |
| 06      3 data records |

Illustratively, the exemplary query shown in Table XVI includes data selection criteria in lines 001-002. The data selection criteria include a result field specification (line 002) which specifies two result fields for which information is to be returned in the query result. Specifically, in line 002 the result fields "Patient_ID" and "Hemoglobin" are specified. Assume now that information related to the result fields "Patient_ID" and "Hemoglobin" is included with the database table "Tests" illustrated in Table XI above. The exemplary query further includes sorting criteria in lines 003-006. The sorting criteria indicate that all data records in the query result should be sorted with respect to a spread of Hemoglobin values (line 004). In this case, the range of values which is defined by the Hemoglobin values of the query result constitutes a predefined value range (e.g., predefined value range 272 of FIG. 2B) for the requested value range coverage. Specifically, the Hemoglobin test values in the "Tests" table of Table XI define the predefined value range [23; 45]. However, it should be noted that the predefined value range may also be provided by a user using a suitable user interface (e.g., user interface 210 of FIG. 2A). The sorting criteria further indicate a predefined maximum number (e.g., predefined maximum number 274 of FIG. 2B) which specifies that only "3" data records should be returned in the query result (line 006).

In one embodiment, executing the query at step 520 includes identifying the data selection criteria and the sorting criteria from the issued query. Executing the query further includes generating a data query on the basis of the identified data selection criteria and executing the data query against the database. In the given example, the data selection criteria "FIND Patient_ID, Hemoglobin" can be identified from the issued query (lines 001-002 of Table XV). Furthermore, the sorting criteria "SORT BY spread of Hemoglobin RETURN 3 data records" can be identified from the issued query (lines 003-006 of Table XV).

The data query which can be generated on the basis of the identified data selection criteria corresponds to the data query shown in Table XII above. In other words, in the given example the data query of Table XII is executed against the database table "Tests" illustrated in Table XI to determine the query result in an initial order for the exemplary query of Table XVI.

At step 530, the query result in the initial order is received. In the given example, receiving the query result in the initial order corresponds to receiving a data query result which corresponds to the data query result shown in Table XIII, as described above with reference to FIG. 4.

At step 540, a subset of the data records of the data query result of Table XIII is selected which satisfies the requested value range coverage. Assume now that the subset of data records should be selected such Hemoglobin test values associated with the data records of the subset define a flat distribution over the predefined value range, i.e., that the Hemoglobin test values are evenly spread over the predefined value range. In other words, three of the data records which have associated Hemoglobin test values that are evenly spread over the predefined value range [23; 45] are identified from the data query result of Table XIII. An exemplary method for identifying the subset of data records from the data query result is described below with reference to FIG. 5B.

At step 550, the data records in the data query result of Table XIII are sorted on the basis of the requested value range coverage. According to one aspect, the sorting comprises including only the three identified data records with the sorted query result. Alternatively, the three identified data records can be placed on the top of the sorted list. Furthermore, the three identified data records can be flagged to indicate that only display of these data records is allowed, while all remaining data records should be hidden to the user. By way of example, assume that in the given example only the three identified data records are included with the sorted list. Assume further that the data records of lines 003, 005 and 006 of Table XIII are identified. Accordingly, the exemplary sorted query result shown in Table XVII below is obtained.

TABLE XVII

EXEMPLARY SORTED QUERY RESULT

| 001 | Patient_ID | Hemoglobin |
|---|---|---|
| 002 | 1 | 23 |
| 003 | 2 | 33 |
| 004 | 2 | 45 |

At step 560, the sorted list of data records (e.g., sorted requested data 240 of FIG. 2B) is output. In the given example, the exemplary sorted query result of Table XVII is output. Method 500 then exits at step 570.

Figure 5B:
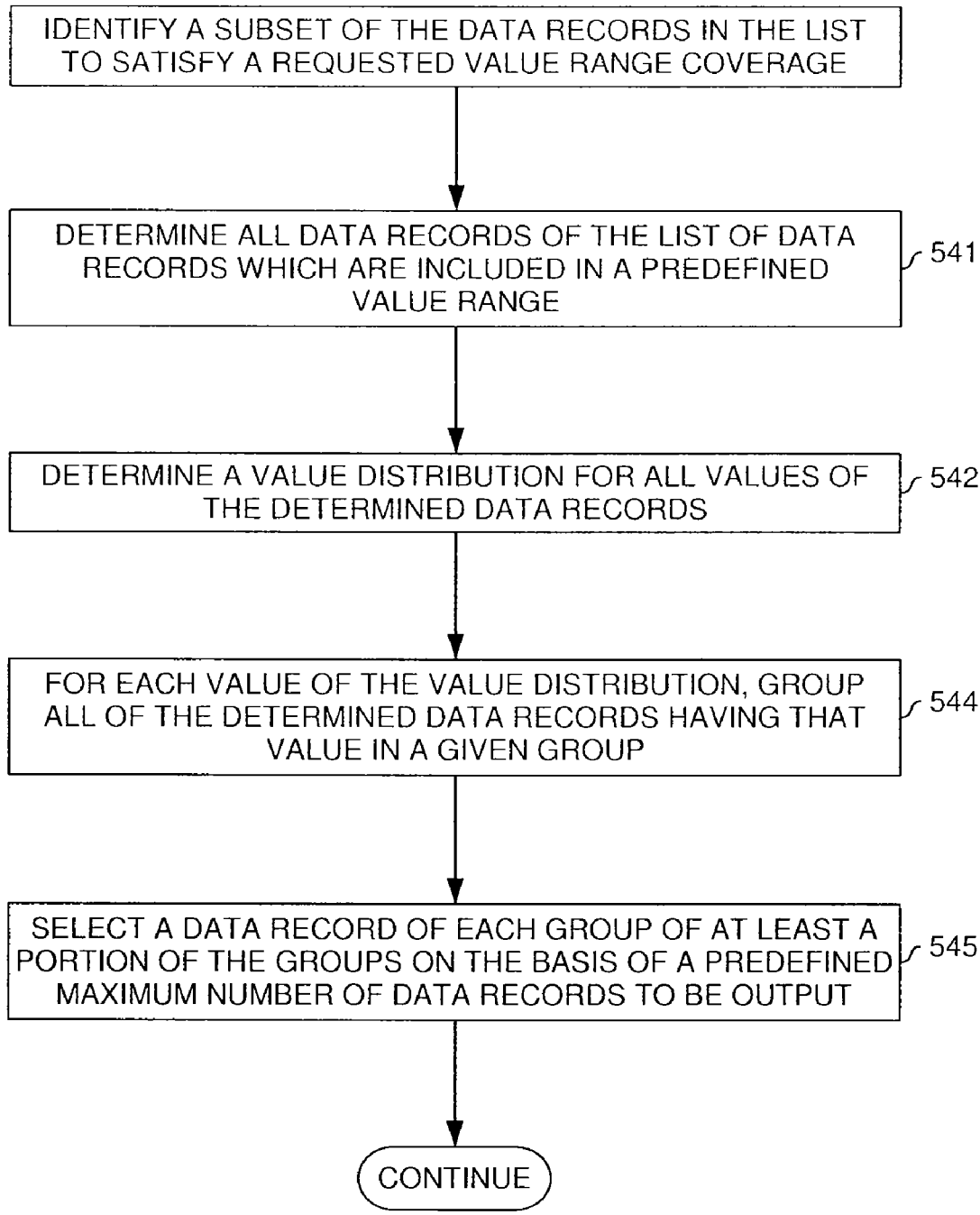

Referring now to FIG. 5B, one embodiment of a method 548 for identifying the subset of data records from the data query result according to step 540 of FIG. 5A is shown. The method 548 starts at step 541, where all data records of the data query result which have an associated value within the predefined value range are determined. In the given example, the associated values of all data records in the data query result of Table XIII are included within the predefined value range [23; 45].

At step 542, a requested value distribution is determined for all associated values which are included within the predefined value range. Assume now that in the given example a flat distribution in the predefined value range [23; 45] is requested. Assume further that three value windows are specified for the flat distribution, such as [23;30], [31;38] and [39;45].

At step 544, all data records of the data query result are grouped into value groups on the basis of the specified value windows. Each value group may include one or more data records. In the given example, the Hemoglobin test values 23, 29, 33, 35 and 45 of the data records shown in Table XIII are grouped into three value groups: (i) the values 23 and 29 are grouped into a first value group corresponding to the value window [23;30], (ii) the values 33 and 35 are grouped into a second value group corresponding to the value window [31; 38], and (iii) the value 45 is grouped into a third value group corresponding to the value window [39;45].

At step 545, one or more data records from at least a portion of the value groups are determined such that a total number of selected data records is equal to, or at least does not exceed, the predefined maximum number, i.e., "3". In the given example, the one or more data records are selected to be evenly spread over the predefined value range in order to define the requested flat distribution. Furthermore, data records for a maximum number of different values of the value distribution are determined, according to one aspect.

In the given example, the predefined maximum number of "3" data records is selected from the three different value groups. Accordingly, one data record is selected for each value group. As the values "23" and "45" of the first and third value groups are boundary values of the predefined value range [23;45] and, thus, equidistant to a median value of the predefined value range, i.e., "34", the data records having these values are selected. Furthermore, a data record having an associated value which is in the second value group is selected. As two data records have associated values in the second value group which are immediately adjacent to the median value, i.e., the data records having the associated values "33" and "35", one of both data records can be selected programmatically in an arbitrary manner so that the requested flat distribution is satisfied. As was noted above, the data record having the associated value "33" is selected. Processing then continues at step 550 of FIG. 5A.

It should be noted that various implementations for selection of the data records in order to satisfy a uniform spread over the value distribution are contemplated. All such implementations are broadly contemplated. For instance, the selection can be based on additional selection criteria provided by a user. More specifically, assume that in the described example the Hemoglobin test value "35" has been established for an individual living in Rochester, Minn. and that the Hemoglobin test value "33" has been established for an individual living in Houston, Tex. Assume further that the user specifies that data records for individuals living in Texas should be preferred. Accordingly, the data record having the Hemoglobin test value "33" for an individual living in Houston, Tex. is selected.

Sorting on the Basis of Suitability Scores

Referring now back to FIG. 2B, the re-ordering of the requested data 230 is performed in still another embodiment on the basis of suitability scores which are determined with respect to the available analysis routines 180. More specifically, a suitability score is determined for each data record of the requested data 230. The suitability score of a given data record indicates a relative suitability of the given data record as input to one or more of the analysis routines 180.

In order to determine the suitability scores for the data records of the requested data 230, the sorting program(s) 126 illustratively invokes an analysis routine identification unit 280. It should be noted that the analysis routine identification unit 280 is represented as a separate unit only by way of example and not for limiting the invention accordingly. In other words, the analysis routine identification unit 280 can also be implemented as an integral part of the sorting program(s) 126 or some other suitable system component.

The analysis routine identification unit 280 identifies one or more analysis routines from the analysis routines 180 which are configured for processing the requested data 230. The analysis routine identification unit 280 then identifies qualifiers, such as row qualifiers and result set qualifiers for the identified analysis routine(s). A row qualifier of a given analysis routine indicates a possible input field of the given analysis routine and may specify a preferred input value for the possible input field. A result set qualifier of a given analysis routine specifies characteristics which qualify a result set that is suitable as input to the given analysis routine. For instance, a result set qualifier may specify that only a result set having Hemoglobin values for each data record is suitable. In one embodiment, the result set qualifier of the given analysis routine indicates a preferred range of input values of the given analysis routine. According to one aspect, the row qualifier(s) and/or result set qualifier(s) of the identified analysis routine(s) can be determined from associated metadata 282.

On the basis of corresponding row and/or result set qualifiers, the analysis routine identification unit 280 determines how suitable each one of the data records of the requested data 230 is as input to the identified analysis routine(s). In the case of an identified row qualifier, the analysis routine identification unit 280 determines for a given data record having a particular value whether an underlying type of the particular value of that data record corresponds to an input type of the possible input field of the identified analysis routine(s). Each time a match of the types is encountered, the suitability score of the given data record is modified. Modifying the suitability score includes, by way of example, increasing or decreasing the suitability score. In the case of an identified result set qualifier, the result set qualifier can be transformed into a set of one time row qualifiers, each of which can be processed similar to the processing of the row qualifier, as described above. Thus, data records which are most suitable as input to the identified analysis routine(s) can be identified and placed on the top of a corresponding sorted list. An exemplary method for re-ordering the requested data 230 on the basis of suitability scores which are determined with respect to the available analysis routines 180 is described below with reference to FIGS. 6A-C.

Figure 6A:
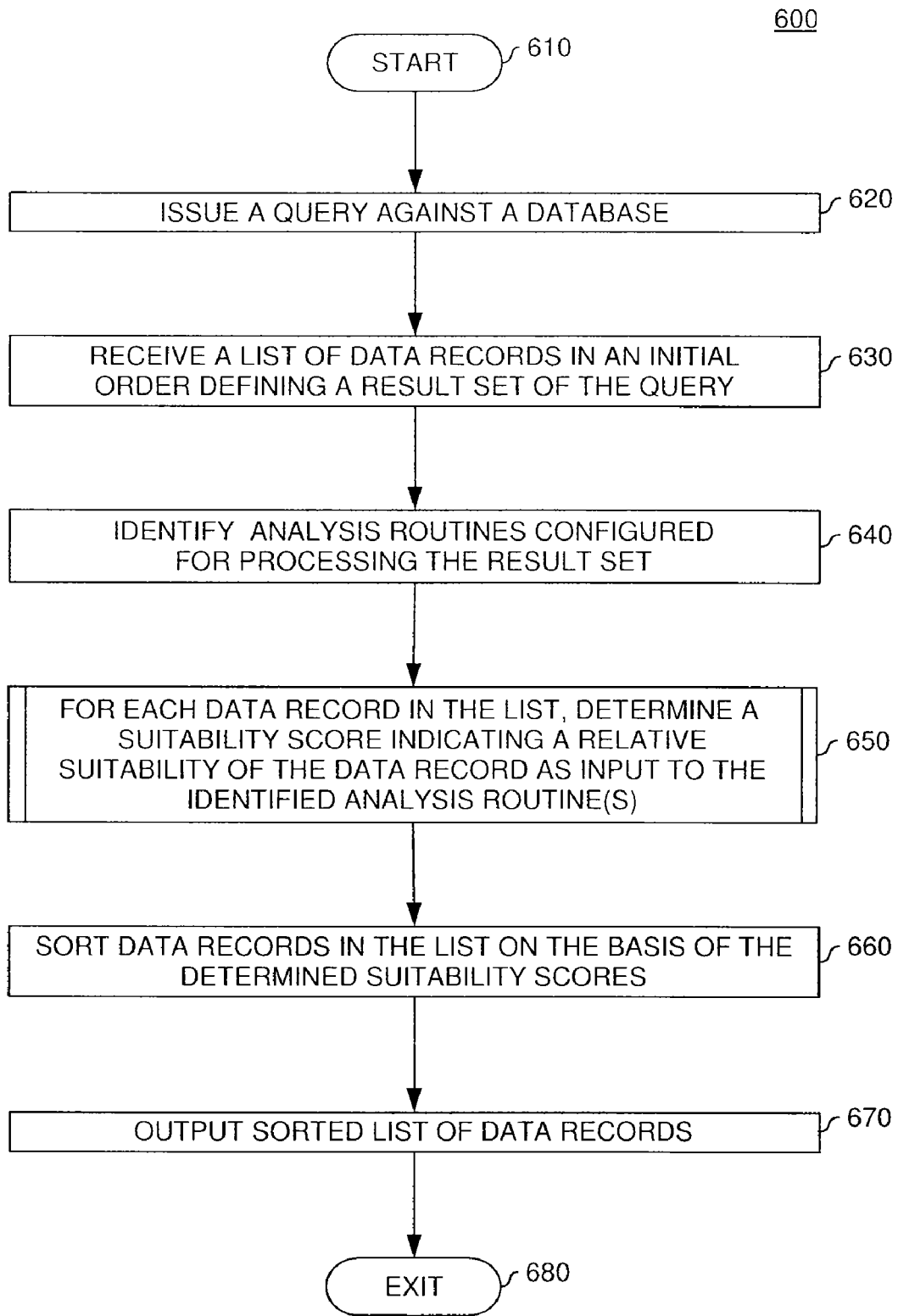
FIGS. 6A-C are flow charts illustrating sorting of data records contained in a query result in still another embodiment.

Referring now to FIG. 6A, one embodiment of a method 600 for re-ordering requested data (e.g., requested data 230 of FIG. 2B) on the basis of suitability scores is shown. The suitability scores are determined for data records included with the requested data with respect to analysis routines which are configured to process the data records. The requested data is obtained in response to execution of a corresponding data request (e.g., data request 220 of FIG. 2A) against data in a database (e.g., data 136 of database 139 of FIG. 2A). Similarly to the methods 300, 400 and 500 of FIGS. 3, 4 and 5, the method 600 is explained by way of example with respect to a query issued against the data in the database in order to obtain a corresponding query result. At least part of the steps of the method 600 can be performed by a suitable requesting entity (e.g., requesting application(s) 124 of FIG. 2A) and suitable functionalities of an associated sorting program(s) (e.g., sorting program(s) 126 of FIG. 2B). Method 600 starts at step 610.

At step 620, the query is issued by a suitable requesting entity (e.g., requesting application 124 of FIG. 2A). The issued query is executed against the data in the database. An exemplary query is shown in Table XVIII below. For simplicity, the exemplary query of Table XVIII is described in natural language without reference to a particular query language. Thus, it is understood that any suitable query language, known or unknown, can be used to create the query of Table XVIII.

TABLE XVIII

| QUERY EXAMPLE |
| --- |
| 01   FIND |
| 02     Patient_ID, Hemoglobin |
| 03   SORT BY |
| 04     available analysis routines |

Illustratively, the exemplary query shown in Table XVIII includes data selection criteria in lines 001-002. The data selection criteria include a result field specification (line 002) which specifies two result fields for which information is to be returned in the query result. Specifically, in line 002 the result fields "Patient_ID" and "Hemoglobin" are specified. Assume now that information related to the result fields "Patient_ID" and "Hemoglobin" is included with the database table "Tests" illustrated in Table XI above. The exemplary query further includes sorting criteria in lines 003-004. The sorting criteria indicate that all data records in the query result should be sorted with respect to available analysis routines (line 004).

In one embodiment, executing the query at step 620 includes identifying the data selection criteria and the sorting criteria from the issued query. Executing the query further includes generating a data query on the basis of the identified data selection criteria and executing the data query against the database. In the given example, the data selection criteria "FIND Patient_ID, Hemoglobin" can be identified from the issued query (lines 001-002 of Table XVIII). Furthermore, the sorting criteria "SORT BY available analysis routines" can be identified from the issued query (lines 003-004 of Table XVIII).

The data query which can be generated on the basis of the identified data selection criteria corresponds to the data query shown in Table XII above. Thus, in the given example the data query of Table XII is executed against the database table "Tests" illustrated in Table XI to determine the query result in an initial order for the exemplary query of Table XVIII.

At step 630, the query result in the initial order is received. In the given example, receiving the query result in the initial order corresponds to receiving the data query result of Table XIII, as described above with reference to FIG. 4.

At step 640, all analysis routines which are configured to process the data query result are identified from a plurality of available analysis routines (e.g., analysis routines 180 of FIG. 2B). According to one aspect, identifying the analysis routines which are configured to process the data query result includes accessing metadata associated with the analysis routines (e.g., metadata 282 of FIG. 2B). The associated metadata may include qualifiers, such as row and result set qualifiers, which specify a type of query result that can be processed by corresponding analysis routines.

At step 650, a suitability score is determined for each data record of the data query result. The suitability score of a given data record indicates a relative suitability of the given data record as input to the identified analysis routine(s). Exemplary methods for determining suitability scores are described below with reference to FIGS. 6B-C.

At step 660, the data records in the data query result are sorted on the basis of the determined suitability scores. At step 670, the sorted list of data records (e.g., sorted requested data 240 of FIG. 2B) is output. Method 600 then exits at step 680.

Figure 6B:
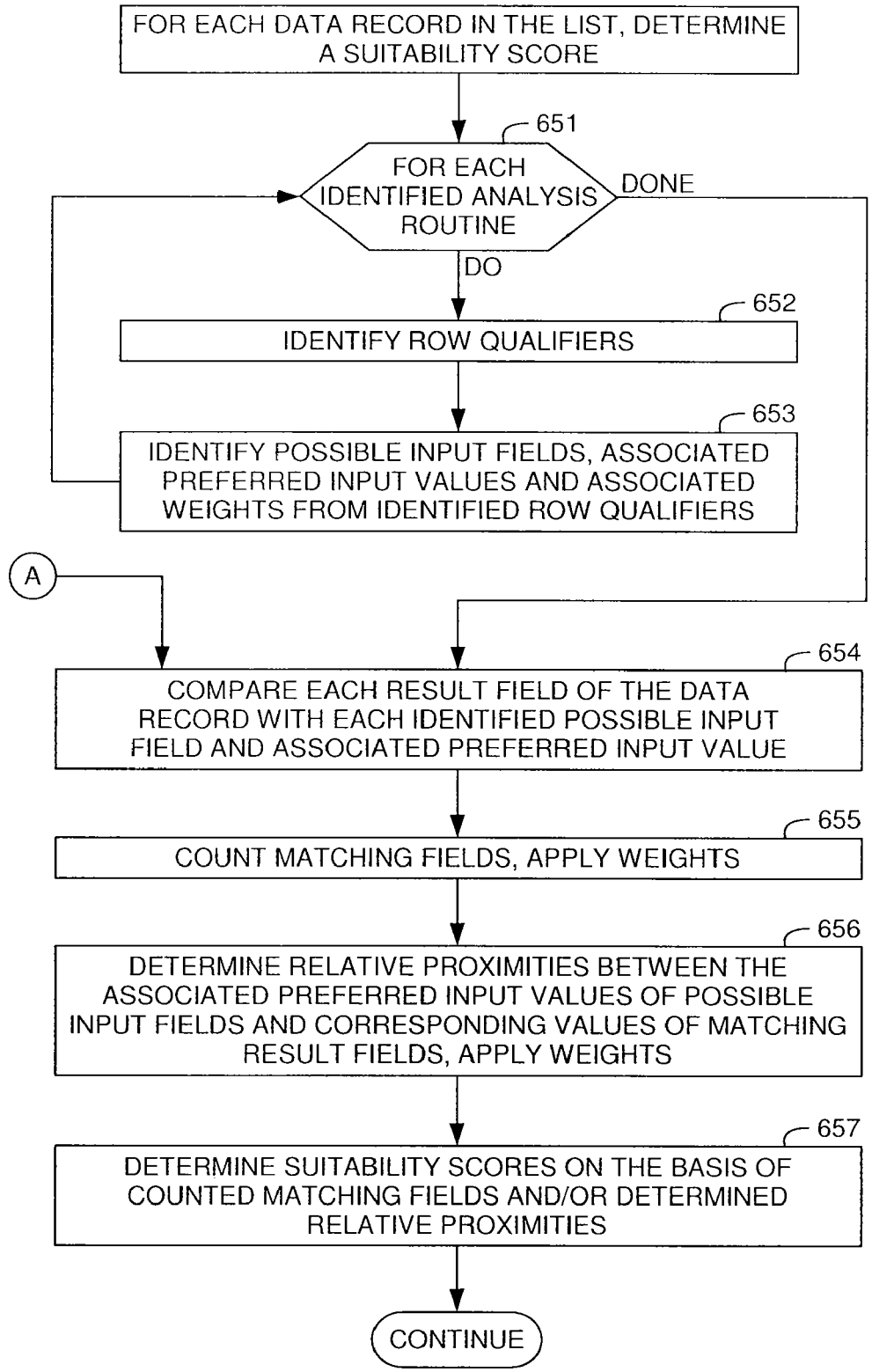

Referring now to FIG. 6B, one embodiment of a method 690 for determining suitability scores for data records of a data query result (e.g., the data query result of Table XIII) according to step 650 of FIG. 6A is shown. The method 690 starts at step 651, where a loop consisting of steps 651-653 is entered for each analysis routine that is identified at step 640 of FIG. 6A.

At step 651, the loop is entered for a given analysis routine. At step 652, all row qualifiers which are associated with the given analysis routine are identified. According to one aspect, each row qualifier indicates a possible input field of the given analysis routine. Furthermore, each row qualifier may specify a preferred input value for the possible input field. Moreover, in one embodiment each row qualifier may have an associated weight. For instance, a first row qualifier may define that a given data record having a Hemoglobin test value greater than 35 is suitable as input to the given analysis routine. The given analysis routine may further have a second row qualifier which defines that a given data record having an Age value greater than 30 is also suitable as input to the given analysis routine. However, assume that the given analysis routine performs better on data records having higher Hemoglobin test values than on data records having higher Age values. In this case, the first row qualifier may be associated with a higher weight than the second row qualifier. Then, at step 653 the possible input fields, the preferred input values and the associated weights of the identified row qualifiers are identified. When the loop consisting of steps 651-653 has been executed for each identified analysis routine, processing continues at step 654.

At step 654, each result field of each data record of the data query result is compared with the identified possible input fields. For all matching fields, the value of the corresponding result field is compared with the preferred input value of the matching possible input field.

At step 655, for each data record of the data query result, all matching fields are counted. Optionally, all associated weights are applied to the counted matching fields.

At step 656, relative proximities for all matching fields of each data record of the data query result are determined. More specifically, for each result field of a given data record that matches a possible input field defined by one of the identified row qualifiers, a relative proximity between the value of the result field and the preferred input value of the matched possible input field is determined. In one embodiment, all associated weights are applied to the determined relative proximities.

According to one aspect, if the preferred input value of a given possible input field is associated with a comparison operator, a difference value between the preferred input value of the possible input field and the values of matching result fields can be determined instead of a relative proximity. For instance, in the example described above the first row qualifier defines that a given data record having a Hemoglobin test value greater than 35 is suitable as input to the given analysis routine. Accordingly, a data record having a Hemoglobin test value of 55 has a difference value of 20 with respect to the predefined Hemoglobin value of 35 (i.e., 55−35=20) and a data record having a Hemoglobin test value of 49 has a difference value of 14 (i.e., 49−35=14).

At step 657, the suitability scores for all data records of the data query result are determined on the basis of the counted matching fields and/or the determined relative proximities. More specifically, according to one aspect, the suitability score of a given data record can be increased or decreased for each matching field with respect to any of the identified analysis routines. The suitability score may also be increased or decreased on the basis of each determined relative proximity or difference value of the given data record with respect to each identified analysis routine. Furthermore, the increase/decrease may be dependent on the determined relative proximity or difference value. For instance, a greater relative proximity may result in a higher increase/decrease. More specifically, in the above example it is assumed that the given analysis routine performs better if the Hemoglobin test value of a given data record and, thus, the corresponding difference value is high. Accordingly, the given analysis routine performs better on the data record having the Hemoglobin test value of 55 and the difference value of 20. Thus, this data record may have a higher increase of its suitability score with respect to the given analysis routine than the data record having the Hemoglobin test value of 49 and the difference value of 14. Processing then continues at step 660 of FIG. 6A.

By way of example, assume that at step 640 of FIG. 6A only a single analysis routine is identified, which is configured to process the data records of the data query result of Table XIII. Assume further that at step 652 the first row qualifier described above is identified for the single analysis routine. As was noted above, the first row qualifier specifies as possible input field the field "Hemoglobin" and as preferred input value values which are greater than 35. Accordingly, the exemplary sorted query result shown in Table XIX below is obtained.

TABLE XIX

EXEMPLARY SORTED QUERY RESULT

| 001 | Patient_ID | Hemoglobin |
|---|---|---|
| 002 | 2 | 45 |
| 003 | 3 | 35 |
| 004 | 2 | 33 |
| 005 | 1 | 29 |
| 006 | 1 | 23 |

Note that in the given example the data record of line 005 of the data query result of Table XIII is presented on the top of the exemplary sorted query result, i.e., in line 002 of Table XIX, as this data record has the greatest Hemoglobin test value.

It should be noted that the determined suitability scores can be expressed by a plurality of score portions, wherein each score portion is related to a different identified analysis routine. In one embodiment, each score portion can be normalized in order to limit the ability of a single identified analysis routine to push a particular data record to the top of the sorted list of data records. Furthermore, all score portions of the plurality of score portions of a given suitability score can be determined and stored separately. In this case, the data query result (e.g., the data query result of Table XIII) can be presented to a user. Thus, the user may decide which analysis routine(s) to use. Accordingly, the sorting can be based on the score portions associated with the user-selected analysis routine(s), as described above.

Figure 6C:
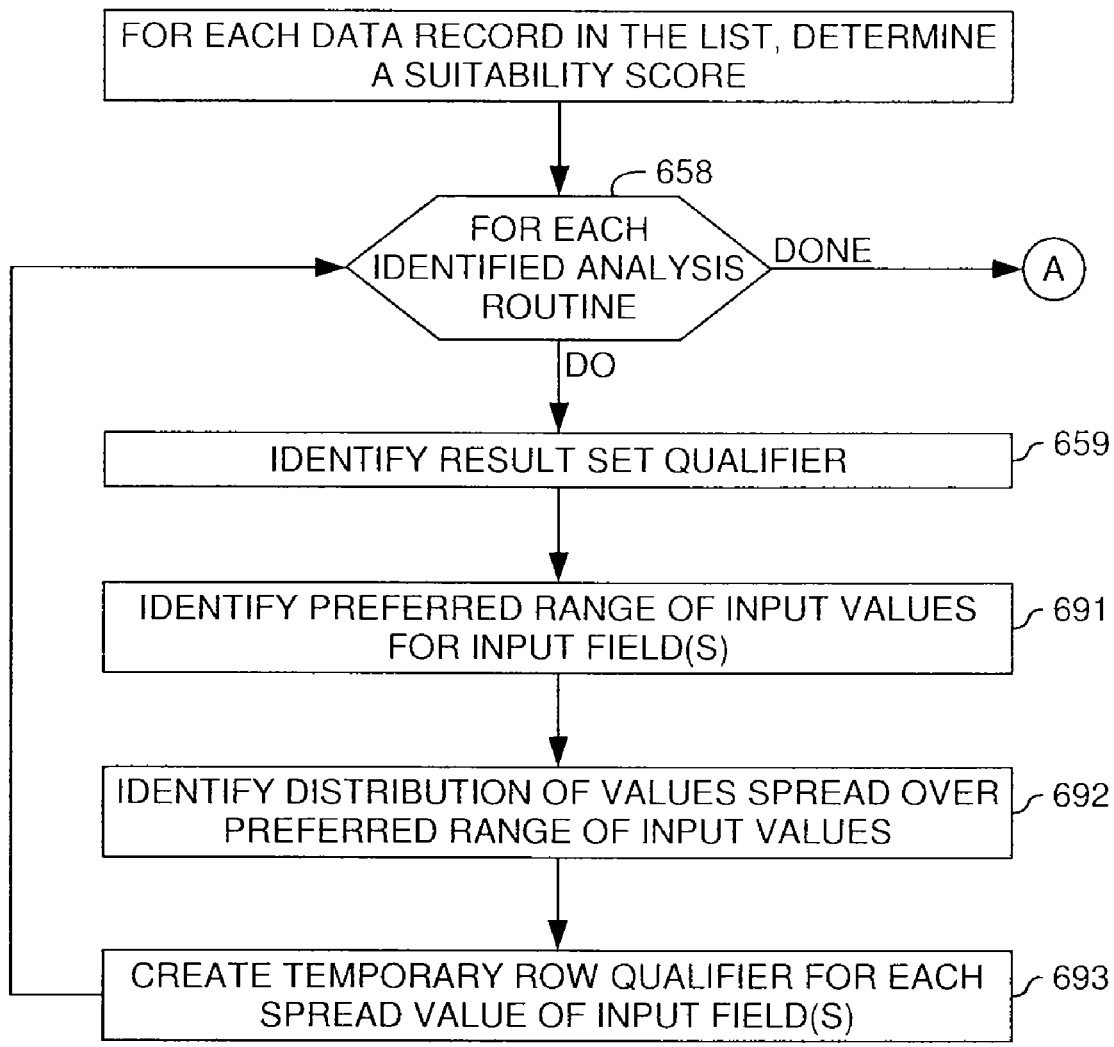

Referring now to FIG. 6C, another embodiment of a method 695 for determining suitability scores for data records of a data query result (e.g., the data query result of Table XIII) according to step 650 of FIG. 6A is shown. The method 695 starts at step 658, where a loop consisting of steps 658, 659, 691, 692 and 693 is entered for each analysis routine that is identified at step 640 of FIG. 6A.

At step 658, the loop is entered for a given analysis routine. At step 659, a result set qualifier which is associated with the given analysis routine is identified. According to one aspect, the result set qualifier indicates a preferred range of input values for a possible input field of the given analysis routine. For instance, a given result set qualifier may define that a given data record having Hemoglobin test values between 20 and 50 is suitable as input to the given analysis routine.

At step 691, the preferred range of input values for the possible input field is determined from the identified result set qualifier. In the given example, the value range [20; 50] is determined.

At step 692, a distribution of values spread over the preferred range of input values is determined. To this end, a number of values of the preferred range of input values is identified such that the identified values are uniformly spread over the preferred range of input values. For instance, the distribution of values may be determined programmatically to include each integer number in the value range [20; 50].

In one embodiment, a predefined number can be provided for determination of the distribution of values. By way of example, the predefined number can be provided with the issued query (i.e., the exemplary query of Table XVIII). Thus, the predefined number of values can be identified from the preferred range of values to define the distribution of values. For instance, assume that in the given example the predefined number is "11". Accordingly, "11" uniformly spread values of the preferred range of values [20; 50] are determined for the distribution of values. By way of example, the values 20, 23, 26, 29, 32, 35, 38, 41, 44, 47, 50 are identified. At step 693, a unique temporary row qualifier is created for each identified value of the distribution of values.

When the loop consisting of steps 658-693 has been executed for each identified analysis routine, processing continues at step 654 of FIG. 6B, where each unique temporary row qualifier is processed similar to a row qualifier (as identified at step 652 of FIG. 6B). However, in one embodiment, if a match is determined for a possible input field and/or preferred input value of a given temporary row qualifier at step 654, the given temporary row qualifier is deleted.

As was noted above, queries issued by a suitable requesting entity (e.g., requesting application 124 of FIG. 1) can be abstract queries formulated on the basis of a data abstraction model (e.g., data abstraction model 132 of FIG. 1). An abstract query can be transformed by a suitable runtime component (e.g., runtime component 134 of FIG. 1) into a concrete query having a form consistent with the physical representation of data contained in an underlying database (e.g., data 136 in database 139 of FIG. 1). The concrete queries can be executed by the runtime component against the database. An exemplary data abstraction model, creation of abstract queries and operation of an exemplary runtime component are further described below with reference to FIGS. 7-10.

Sorting in an Abstract Query Environment

Figure 7:
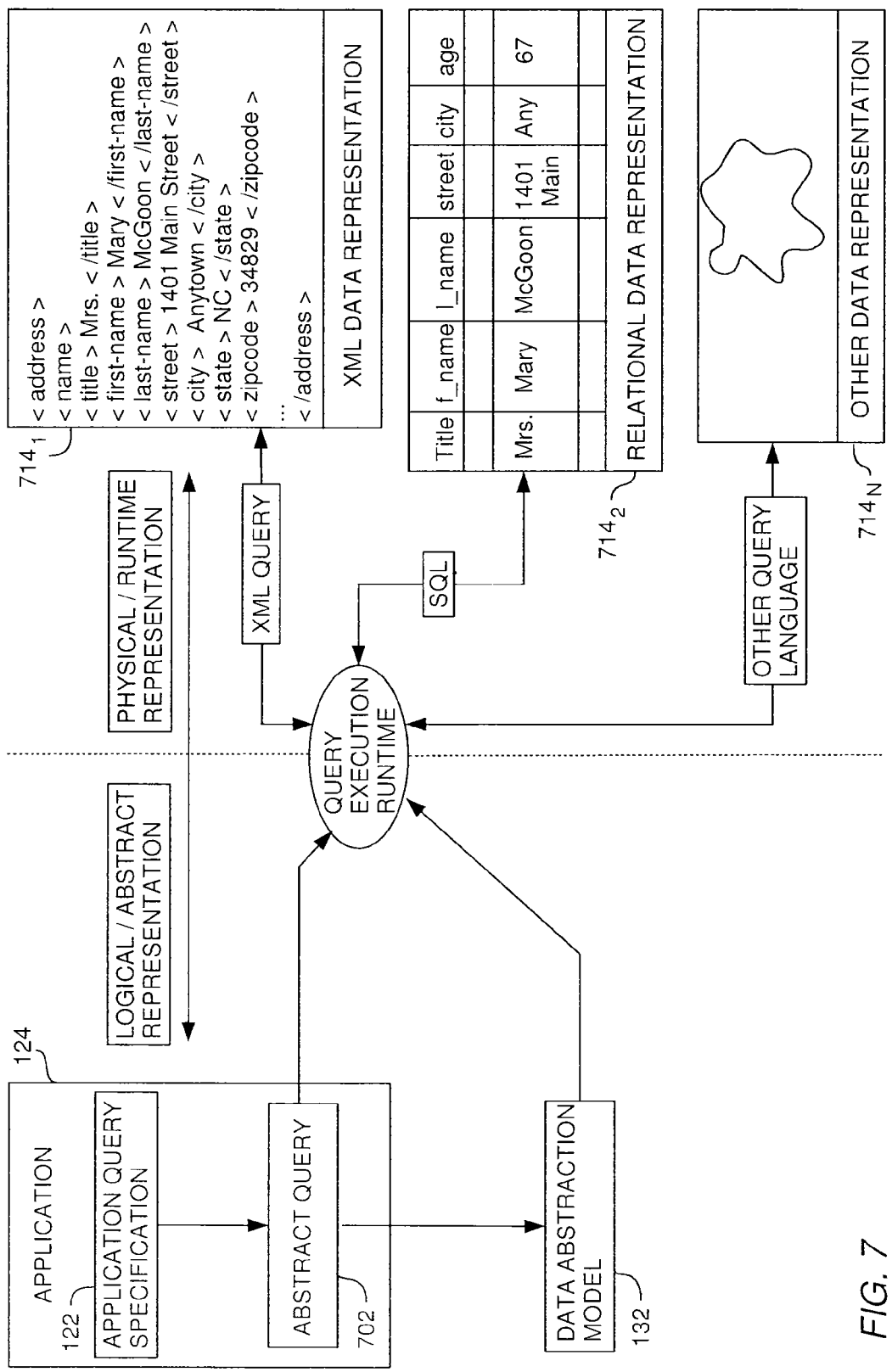
FIGS. 7-8 are relational views of software components for query building support in one embodiment.

Referring now to FIG. 7, a relational view illustrating operation and interaction of the requesting application 124 of FIG. 1 and the data abstraction model 132 of FIG. 1 is shown. The data abstraction model 132 defines logical fields corresponding to physical entities of data in a database (e.g., data 136 in database 139), thereby providing a logical representation of the data. In a relational database environment having a multiplicity of database tables, a specific logical representation having specific logical fields can be provided for each database table. In this case, all specific logical representations together constitute the data abstraction model 132. The physical entities of the data are arranged in the database according to a physical representation of the data in the database. By way of illustration, two physical representations are shown, an XML data representation $714_1$ and a relational data representation $714_2$. However, the physical representation $714_N$ indicates that any other physical representation, known or unknown, is contemplated. In one embodiment, a different single data abstraction model is provided for each separate physical representation 714, as explained above for the case of a relational database environment. In an alternative embodiment, a single data abstraction model 132 contains field specifications (with associated access methods) for two or more physical representations 714.

Figure 8:
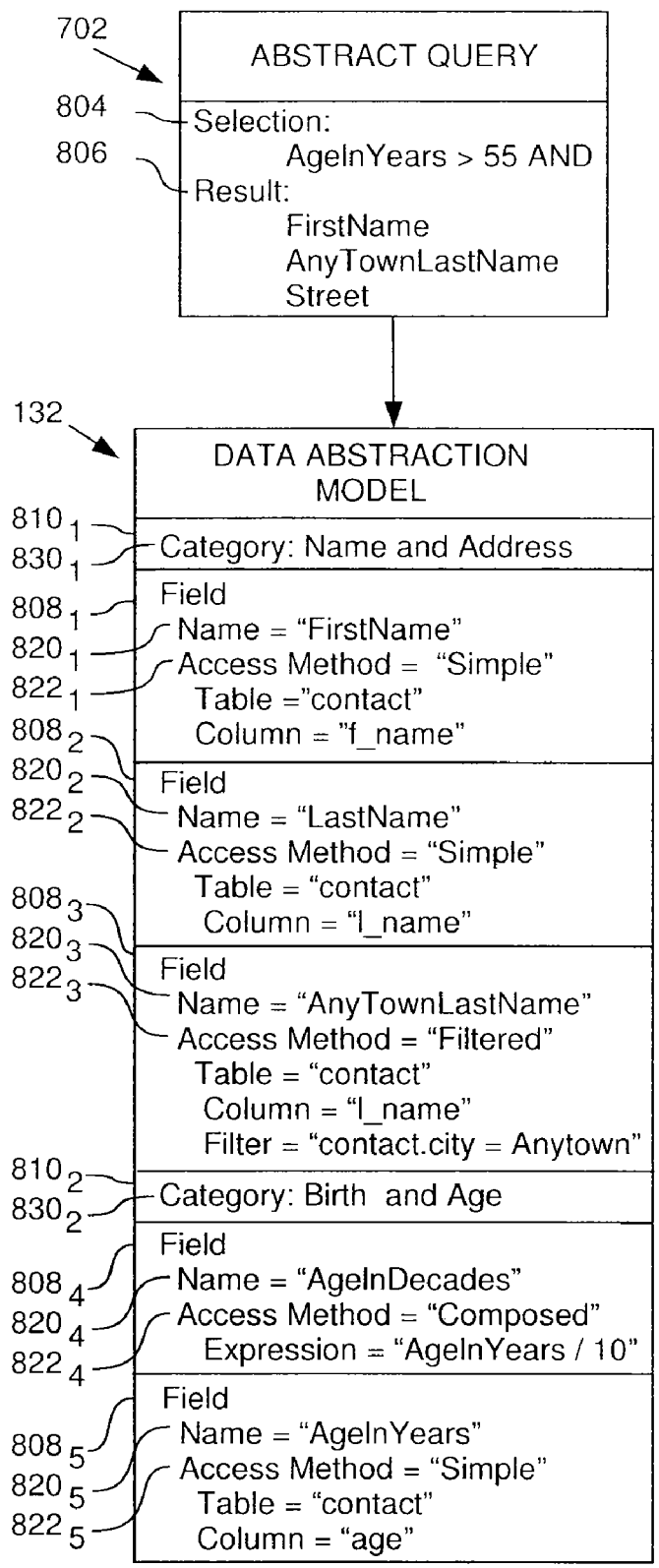

Using a logical representation of the data, the application query specification 122 of FIG. 1 specifies one or more logical fields to compose a resulting query 702. A requesting entity (e.g., the requesting application 124) issues the resulting query 702 as defined by an application query specification of the requesting entity. In one embodiment, the abstract query 702 may include both criteria used for data selection and an explicit specification of result fields to be returned based on the data selection criteria. An example of the selection criteria and the result field specification of the abstract query 702 is shown in FIG. 8. Accordingly, the abstract query 702 illustratively includes selection criteria 804 and a result field specification 806.

The resulting query 702 is generally referred to herein as an "abstract query" because the query is composed according to abstract (i.e., logical) fields rather than by direct reference to the underlying physical data entities in the database. As a result, abstract queries may be defined that are independent of the particular underlying physical data representation used. For execution, the abstract query is transformed into a concrete query consistent with the underlying physical representation of the data using the data abstraction model 132.

In general, the data abstraction model 132 exposes information as a set of logical fields that may be used within an abstract query to specify criteria for data selection and specify the form of result data returned from a query operation. The logical fields are defined independently of the underlying physical representation being used in the database, thereby allowing abstract queries to be formed that are loosely coupled to the underlying physical representation.

Referring now to FIG. 8, a relational view illustrating interaction of the abstract query 702 and the data abstraction model 132 is shown. In one embodiment, the data abstraction model 132 comprises a plurality of field specifications $808_1$, $808_2$, $808_3$, $808_4$ and $808_5$ (five shown by way of example), collectively referred to as the field specifications 808. Specifically, a field specification is provided for each logical field available for composition of an abstract query. Each field specification may contain one or more attributes. Illustratively, the field specifications 808 include a logical field name attribute $820_1$, $820_2$, $820_3$, $820_4$, $820_5$ (collectively, field name 820) and an associated access method attribute $822_1$, $822_2$, $822_3$, $822_4$, $822_5$ (collectively, access methods 822). Each attribute may have a value. For example, logical field name attribute $820_1$ has the value "FirstName" and access method attribute $822_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $822_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $810_1$ and $810_2$ (two shown by way of example), collectively referred to as the category specifications. In one embodiment, a category specification is provided for each logical grouping of two or more logical fields. For example, logical fields $808_{1-3}$ and $808_{4-5}$ are part of the category specifications $810_1$ and $810_2$, respectively. A category specification is also referred to herein simply as a "category". The categories are distinguished according to a category name, e.g., category names $830_1$ and $830_2$ (collectively, category name(s) 830). In the present illustration, the logical fields $808_{1-3}$ are part of the "Name and Address" category and logical fields $808_{4-5}$ are part of the "Birth and Age" category.

The access methods 822 generally associate (i.e., map) the logical field names to data in the database (e.g., database 139 of FIG. 1). Any number of access methods is contemplated depending upon the number of different types of logical fields to be supported. In one embodiment, access methods for simple fields, filtered fields and composed fields are provided. The field specifications $808_1$, $808_2$ and $808_5$ exemplify simple field access methods $822_1$, $822_2$, and $822_5$, respectively. Simple fields are mapped directly to a particular entity in the underlying physical representation (e.g., a field mapped to a given database table and column). By way of illustration, as described above, the simple field access method $822_1$ shown in FIG. 8 maps the logical field name $820_1$ ("FirstName") to a column named "f_name" in a table named "contact". The field specification $808_3$ exemplifies a filtered field access method $822_3$. Filtered fields identify an associated physical entity and provide filters used to define a particular subset of items within the physical representation. An example is provided in FIG. 8 in which the filtered field access method $822_3$ maps the logical field name $820_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $808_4$ exemplifies a composed field access method $822_4$. Composed access methods compute a logical field from one or more physical fields using an expression supplied as part of the access method definition. In this way, information which does not exist in the underlying physical data representation may be computed. In the example illustrated in FIG. 8 the composed field access method $822_4$ maps the logical field name $820_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 808 include a type attribute which reflects the format of the underlying data. However, in another embodiment, the data format of the field specifications 808 is different from the associated underlying physical data, in which case a conversion of the underlying physical data into the format of the logical field is required.

By way of example, the field specifications 808 of the data abstraction model 132 shown in FIG. 8 are representative of logical fields mapped to data represented in the relational data representation $714_2$ shown in FIG. 7. However, other instances of the data abstraction model 132 map logical fields to other physical representations, such as XML.

An illustrative abstract query corresponding to the abstract query 702 shown in FIG. 8 is shown in Table XX below. By way of illustration, the illustrative abstract query is defined using XML. However, any other language may be used to advantage.

TABLE XX

ABSTRACT QUERY EXAMPLE

```
01 <?xml version="1.0"?>
02 <!--Query string representation: (AgeInYears > "55"-->
03 <QueryAbstraction>
04   <Selection>
05      <Condition internalID="4">
06      <Condition field="AgeInYears" operator="GT" value="55"
07            internalID="1"/>
08   </Selection>
09   <Results>
10      <Field name="FirstName"/>
11      <Field name="AnyTownLastName"/>
12      <Field name="Street"/>
13   </Results>
14 </QueryAbstraction>
```

Illustratively, the abstract query shown in Table XX includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 8 is shown in Table XXI below. By way of illustration, the illustrative Data Abstraction Model is defined using XML. However, any other language may be used to advantage.

TABLE XXI

DATA ABSTRACTION MODEL EXAMPLE

```
01 <?xml version="1.0"?>
02 <DataAbstraction>
03 <Category name="Name and Address">
04    <Field queryable="Yes" name="FirstName" displayable="Yes">
05       <AccessMethod>
06         <Simple columnName="f_name" tableName="contact"></Simple>
```

TABLE XXI-continued

DATA ABSTRACTION MODEL EXAMPLE

```
07            </AccessMethod>
08      </Field>
09      <Field queryable="Yes" name="LastName" displayable="Yes">
10            <AccessMethod>
11                  <Simple columnName="l_name" tableName="contact"></Simple>
12            </AccessMethod>
13      </Field>
14      <Field queryable="Yes" name="AnyTownLastName" displayable="Yes">
15            <AccessMethod>
16                  <Filter columnName="l_name" tableName="contact">
17      </Filter="contact.city=Anytown">
18            </AccessMethod>
19      </Field>
20  </Category>
21  <Category name="Birth and Age">
22      <Field queryable="Yes" name="AgeInDecades" displayable="Yes">
23            <AccessMethod>
24  <Composed columnName="age" tableName="contact">
25  </Composed Expression="columnName/10">
26            </AccessMethod>
27      </Field>
28      <Field queryable="Yes" name="AgeInYears" displayable="Yes">
29            <AccessMethod>
30  <Simple columnName="age" tableName="contact"></Simple>
31            </AccessMethod>
32      </Field>
33  </Category>
34  </DataAbstraction>
```

By way of example, note that lines 004-008 correspond to the first field specification $808_1$ of the DAM 132 shown in FIG. 8 and lines 009-013 correspond to the second field specification $808_2$.

Figure 9:
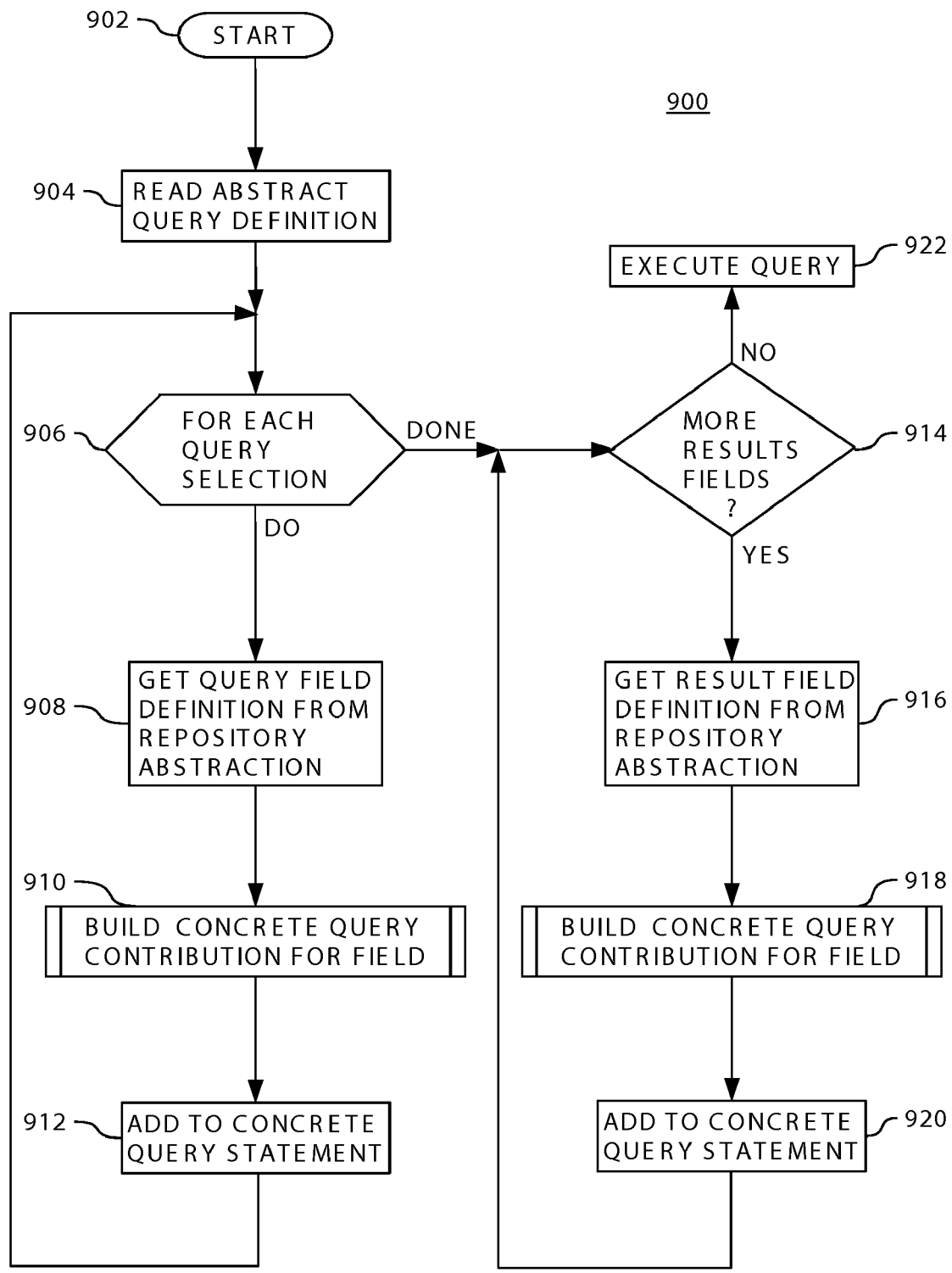
FIGS. 9-10 are flow charts illustrating the operation of a runtime component.
Figure 10:
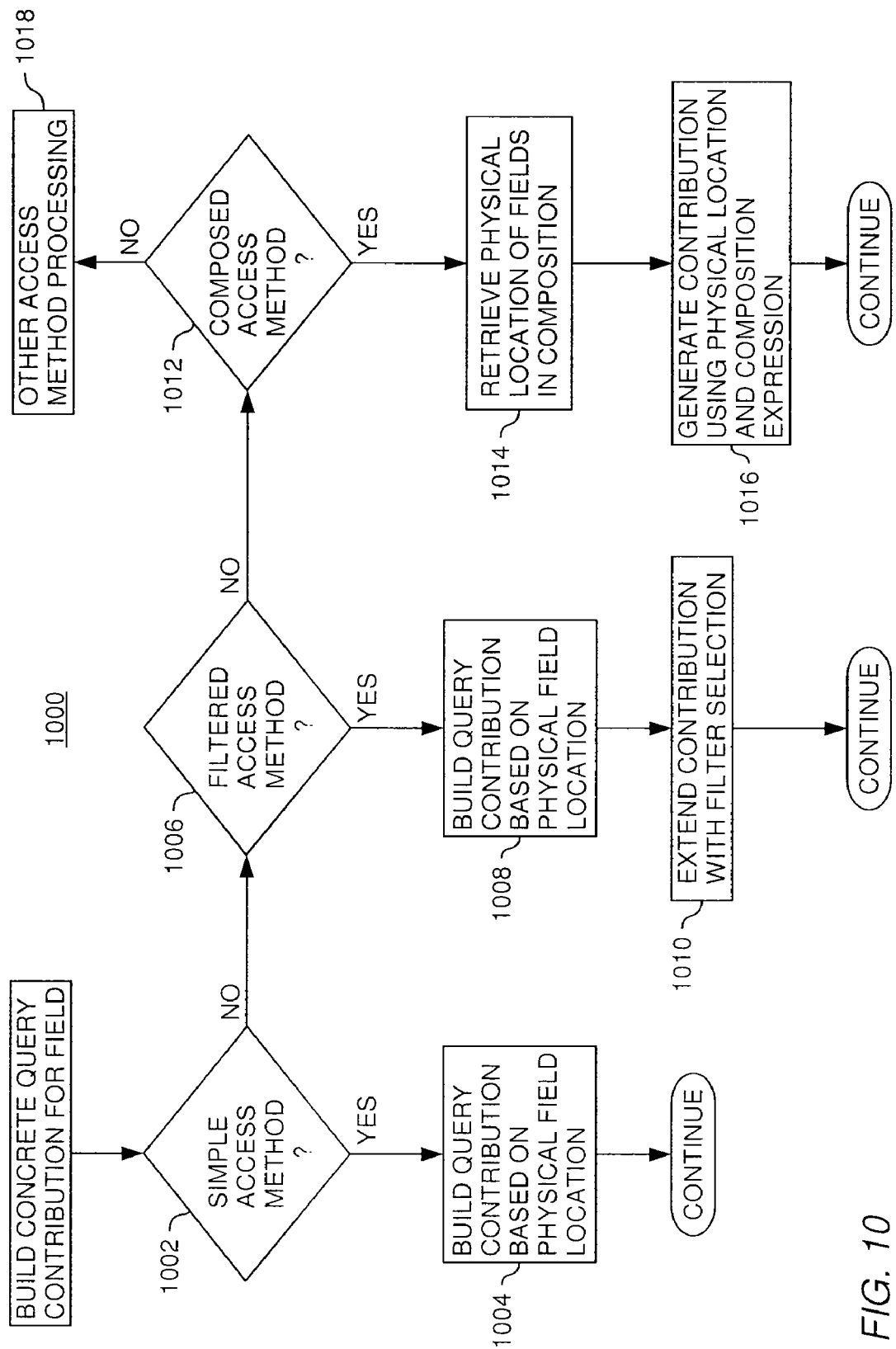

Referring now to FIG. 9, an illustrative runtime method 900 exemplifying one embodiment of the operation of the runtime component 134 of FIG. 1 is shown. The method 900 is entered at step 902 when the runtime component receives as input an abstract query (such as the abstract query shown in Table XX). At step 904, the runtime component reads and parses the abstract query and locates individual selection criteria and desired result fields. At step 906, the runtime component enters a loop (comprising steps 906, 908, 910 and 912) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 908, the runtime component uses the field name from a selection criterion of the abstract query to look up the definition of the field in the data abstraction model 132 of FIG. 1. As noted above, the field definition includes a definition of the access method used to access the physical data associated with the field. The runtime component then builds (step 910) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement. The method 900 then returns to step 906 to begin processing for the next field of the abstract query. Accordingly, the process entered at step 906 is iterated for each data selection field in the abstract query, thereby contributing additional content to the eventual query to be performed.

After building the data selection portion of the concrete query, the runtime component identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 900 enters a loop at step 914 (defined by steps 914, 916, 918 and 920) to add result field definitions to the concrete query being generated. At step 916, the runtime component looks up a result field name (from the result specification of the abstract query) in the data abstraction model 132 and then retrieves a result field definition from the data abstraction model 132 to identify the physical location of data to be returned for the current logical result field. The runtime component then builds (at step 918) a concrete query contribution (of the concrete query that identifies physical location of data to be returned) for the logical result field. At step 920, the concrete query contribution is then added to the concrete query statement. Once each of the result specifications in the abstract query has been processed, the concrete query is executed at step 922.

One embodiment of a method 1000 for building a concrete query contribution for a logical field according to steps 910 and 918 is described with reference to FIG. 9. At step 1002, the method 1000 queries whether the access method associated with the current logical field is a simple access method. If so, the concrete query contribution is built (step 1004) based on physical data location information and processing then continues according to method 900 described above. Otherwise, processing continues to step 1006 to query whether the access method associated with the current logical field is a filtered access method. If so, the concrete query contribution is built (step 1008) based on physical data location information for some physical data entity. At step 1010, the concrete query contribution is extended with additional logic (filter selection) used to subset data associated with the physical data entity. Processing then continues according to method 900 described above.

If the access method is not a filtered access method, processing proceeds from step 1006 to step 1012 where the method 1000 queries whether the access method is a composed access method. If the access method is a composed access method, the physical data location for each sub-field reference in the composed field expression is located and retrieved at step 1014. At step 1016, the physical field location information of the composed field expression is substituted for the logical field references of the composed field expression, whereby the concrete query contribution is generated. Processing then continues according to method 900 described above.

If the access method is not a composed access method, processing proceeds from step 1012 to step 1018. Step 1018 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   in response to a query issued by a requesting entity against a data abstraction model abstractly describing data in a database, wherein the query specifies to order query results responsive to the query, based on a relative proximity between: (i) data retrieved for a logical field of the data abstraction model, and (ii) a predefined value, wherein the query specifies the predefined value:
   a) receiving a list of data records ordered according to an initial order, the list of data records defining a result set for the query;
   b) before outputting the result set, determining a value variance for each data record in the list, the value variance of a given data record indicating a relative proximity between the predefined value and a corresponding value of the given data record;
   c) sorting the received list of data records on the basis of the determined value variances; and
   d) outputting the sorted list of data records.

2. The method of claim 1, wherein sorting the received list of data records on the basis of the predefined value variance comprises:
   ranking the data records according to the determined relative proximities.

3. The method of claim 1, wherein the query comprises:
   (i) data selection criteria configured to select the data records of the list of data records from the database; and
   (ii) sorting criteria configured to specify the predefined value.

4. The method of claim 3, further comprising:
   identifying the data selection criteria from the issued query;
   identifying the sorting criteria from the issued query; and
   generating a query on the basis of the identified data selection criteria.

5. The method of claim 4, wherein at least one of the issued query and the generated query is one of an SQL and an XML query.

6. The method of claim 4, further comprising:
   executing the generated query against the database to identify the data records of the list of data records.

7. The method of claim 6, wherein the issued query and the generated query are abstract queries, each having one or more logical fields of the data abstraction model; and wherein the data abstraction model is adapted for transforming the one or more logical fields of the abstract queries into a form consistent with a physical representation of the data in the database.

8. The method of claim 6, wherein the database is a server-side data source and the sorting is done by a client-side application.

9. The method of claim 6, wherein the database is a server-side data source and the sorting is done by a server-side application.

10. A computer-readable storage medium containing a program which, when executed by a processor, performs operations comprising:
    in response to a query issued by a requesting entity against a data abstraction model abstractly describing data in a database, wherein the query specifies to order query results responsive to the query, based on a relative proximity between: (i) data retrieved for a logical field of the data abstraction model, and (ii) a predefined value, wherein the query specifies the predefined value:
    a) receiving a list of data records ordered according to an initial order, the list of data records defining a result set for the query;
    b) before outputting the result set, determining a value variance for each data record in the list, the value variance of a given data record indicating a relative proximity between a predefined value and a corresponding value of the given data record;
    c) sorting the received list of data records on the basis of the determined value variances; and
    d) outputting the sorted list of data records.

11. The computer-readable storage medium of claim 10, wherein sorting the received list of data records on the basis of the predefined value variance comprises:
    ranking the data records according to the determined relative proximities.

12. The computer-readable storage medium of claim 10, wherein the query comprises:
    (i) data selection criteria configured to select the data records of the list of data records from the database; and
    (ii) sorting criteria configured to specify the predefined value.

13. The computer-readable storage medium of claim 12, wherein the operations further comprise:
    identifying the data selection criteria from the issued query;
    identifying the sorting criteria from the issued query; and
    generating a query on the basis of the identified data selection criteria.

14. The computer-readable storage medium of claim 13, wherein at least one of the issued query and the generated query is one of an SQL and an XML query.

15. The computer-readable storage medium of claim 13, wherein the operations further comprise:
    executing the generated query against the database to identify the data records of the list of data records.

16. The computer-readable storage medium of claim 15, wherein the issued query and the generated query are abstract queries, each having one or more logical fields of the data abstraction model; and wherein the data abstraction model is adapted for transforming the one or more logical fields of the abstract queries into a form consistent with a physical representation of the data in the database.

17. The computer-readable storage medium of claim 15, wherein the database is a server-side data source and the sorting is done by a client-side application.

18. The computer-readable storage medium of claim 15, wherein the database is a server-side data source and the sorting is done by a server-side application.

19. A computer system, comprising:
one or more computer processors;
a memory containing a program which, when executed by the one or more computer processors, is configured to perform an operation in response to a query issued by a requesting entity against a data abstraction model abstractly describing data in a database, wherein the query specifies to order query results responsive to the query, based on a relative proximity between: (i) data retrieved for a logical field of the data abstraction model, and (ii) a predefined value, wherein the query specifies the predefined value, wherein the operation comprises:
a) receive a list of data records ordered according to an initial order, the list of data records defining a result set for the query;
b) before outputting the result set, determine a value variance for each data record in the list, the value variance of a given data record indicating a relative proximity between a predefined value and a corresponding value of the given data record;
c) sort the received list of data records on the basis of the determined value variances; and
d) output the sorted list of data records.

* * * * *